United States Patent
Xu et al.

(10) Patent No.: US 7,706,373 B2
(45) Date of Patent: Apr. 27, 2010

(54) SESSION INITIATION AND MAINTENANCE WHILE ROAMING

(75) Inventors: Richard H. Xu, San Jose, CA (US); Chong-Jin Koh, Sunnyvale, CA (US); Bryan Ford, Cambridge, MA (US); Markus Hahn, Santa Cruz, CA (US); Gabriel Berryn Levy, Oakland, CA (US); Ching-Hai Tsai, San Jose, CA (US); Yusuf Saib, Santa Clara, CA (US); Srinivasa Yarrakonda, Fremont, CA (US)

(73) Assignee: Nuvoiz, Inc., Mountain View, CA (US)

( * ) Notice: Subject to any disclaimer, the term of this patent is extended or adjusted under 35 U.S.C. 154(b) by 541 days.

(21) Appl. No.: 11/555,669

(22) Filed: Nov. 1, 2006

(65) Prior Publication Data

US 2008/0148379 A1 Jun. 19, 2008

(51) Int. Cl.
  *H04L 12/56* (2006.01)
(52) U.S. Cl. .................. 370/392; 370/352; 726/11; 713/201
(58) Field of Classification Search .................. None
  See application file for complete search history.

(56) References Cited

U.S. PATENT DOCUMENTS

| 7,349,348 | B1 * | 3/2008 | Johnson et al. | 370/254 |
| 2002/0188712 | A1 * | 12/2002 | Caslin et al. | 709/223 |
| 2004/0028035 | A1 * | 2/2004 | Read | 370/352 |
| 2005/0210292 | A1 * | 9/2005 | Adams et al. | 713/201 |
| 2006/0053485 | A1 * | 3/2006 | Li | 726/11 |
| 2006/0215684 | A1 * | 9/2006 | Capone | 370/437 |
| 2007/0157303 | A1 * | 7/2007 | Pankratov | 726/11 |

OTHER PUBLICATIONS

C. Boulton et al., "Best Current Practices for NAT Traversal for SIP" (Jun. 26, 2006), viewed at http://www.ietf.org/internet-drafts/draft-ietf-sipping-nat-scenarios-05.txt on Sep. 30, 2006.

J. Rosenberg et al., "STUN—Simple Traversal of User Datagram Protocol (UDP) Through Network Address Translators (NATs)" RFC 3489 (Mar. 2003) viewed at http://www.ietf.org/rfc/rfc3489.txt?number=3489 on Sep. 30, 2006.

J. Rosenberg et al., "Traversal Using Relay NAT (TURN)", draft-rosenberg-midcom-turn-08 (Sep. 9, 2005) viewed at http://tools.ietf.org/html/draft-rosenberg-midcom-turn-08 on Sep. 30, 2006.

(Continued)

*Primary Examiner*—Ayaz R Sheikh
*Assistant Examiner*—Faiyazkhan Ghafoerkhan
(74) *Attorney, Agent, or Firm*—Ernest J. Beffel, Jr.; Haynes Beffel & Wolfeld, LLP

(57) ABSTRACT

The technology disclosed addresses initiation of peer-to-peer media exchange sessions, with traversal of NAT and firewall devices, in a manner adapted to roaming. In particular, involves preliminary determination of NAT/firewall topology, which reduces latency at initiation, and hole punching technologies to select a routing and traversal strategy that reduce reliance on external media relay devices.

24 Claims, 21 Drawing Sheets

OTHER PUBLICATIONS

J. Rosenberg et al., "Obtaining Relay Addresses from Simple Traversal of UDP Through NAT (STUN)" draft-ietf-behav-turn-01 (Feb. 2006) viewed at http://www.ietf.org/internet-drafts/draft-ietf-behave-turn-01.txt on Sep. 30, 2006.

J. Rosenberg, "Interactive Connectivity Establishment (ICE): A Methodology for Network Address Translator (NAT) Traversal for the Session Initiation Protocol (SIP)", draft-rosenberg-sipping-ice-01 (Jun. 30, 2003) viewed at http://tools.ietf.org/html/draft-rosenberg-sipping-ice-01 on Sep. 30, 2006.

S. Baset and H. Schulzrinne, "An Analysis of the Skype Peer-to-Peer Internet Telephony Protocol," in Proceedings of the INFOCOM '06 (Barcelona, Spain, Apr. 2006) accessed on Oct. 7, 2006 via http://www1.cs.columbia.edu/~salman/skype/.

Wikipeda, "*Session Initiation Protocol*" accessed on Sep. 24, 2006 at http://en.wikipedia.org/wiki/Session_Initiation_Protocol.

Yu, Yun-Shuai et al. "An Efficient NAT Traversal for SIP and its Associated Media Sessions," Int. Computer Symposium, Dec. 15-17, 2004, Taipei, Taiwan.

Eyeball Networks, Inc., "Any-Firewall Server—Scalable NAT and firewall traversal based on STUN, TURN and ICE," 2005.

Georgescu, Adrian, "Best pracitces for SIP NAT traversal" available online at http://mediaproxy.ag-projects.com/NATtraversal-BestPractices.pdf#search=%22ice%20turn%20stun%20nat%20traversal%22, accessed Sep. 25, 2006.

Newport Networks, "Solving the Firewall and NAT Traversal Issues for MoIP," 2006.

Thernelius, Fredrik, "SIP, NAT, and Firewalls," Master's Thesis, Dept. of Teleinformatics, Royal Institute of Technology, Stockholm, Sweden, May 2000.

Ford, Bryan et al. "Peer-to-Peer Communication Across Network Address Translators," USENIX Annual Technical Conference, Apr. 10-15, 2005.

J. Rosenberg et al., "An Offer/Answer Model with the Session Description Protocol (SDP)", (2002) available online at http://www.ietf.org/rfc/rfc3264.txt.

\* cited by examiner

Topology Learning – UDP allowed

Topology Learning – UDP fails

NAT Probing

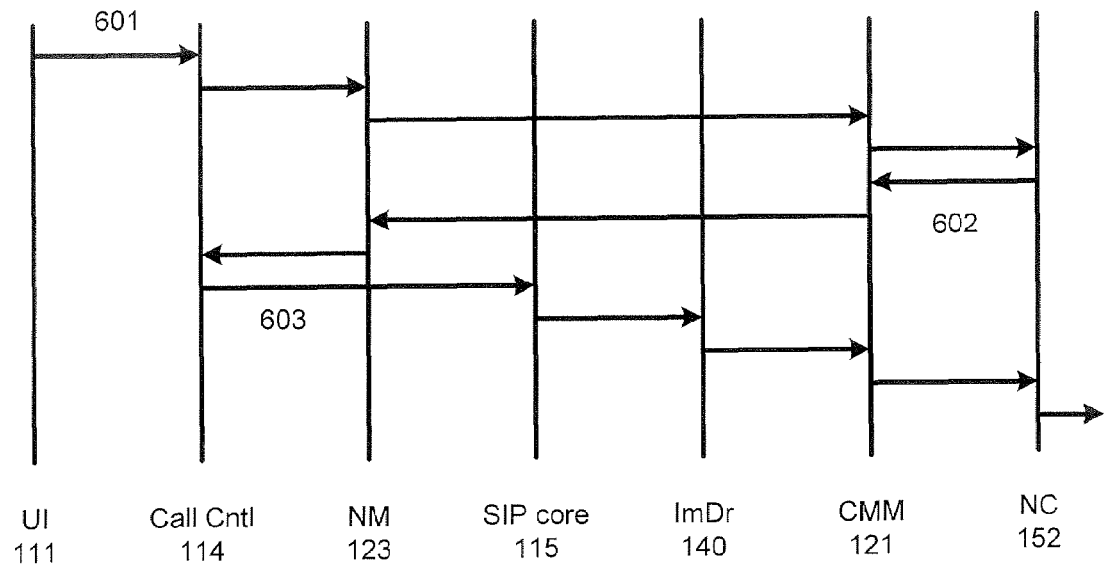
FIG. 6 SIP Registration
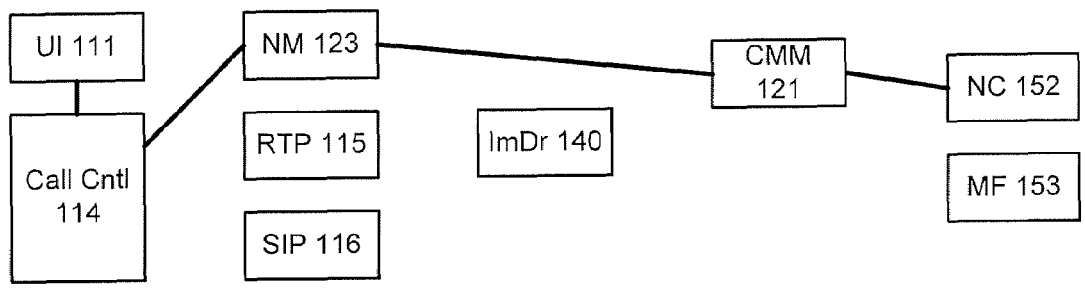
FIG. 5 SIP pre-registration flow
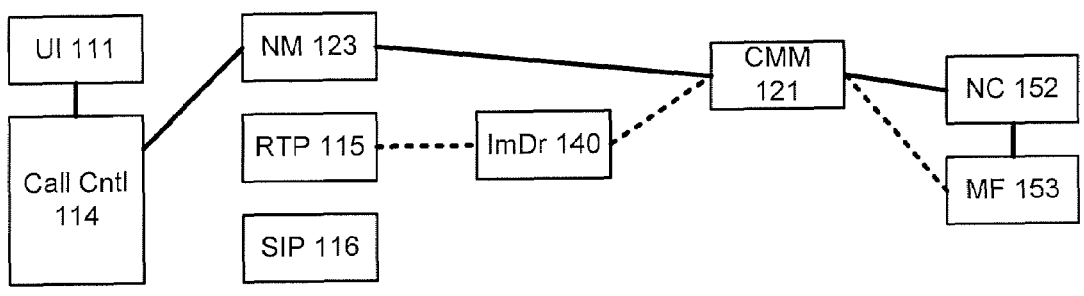
FIG. 7 Initiation – TCP tunnel

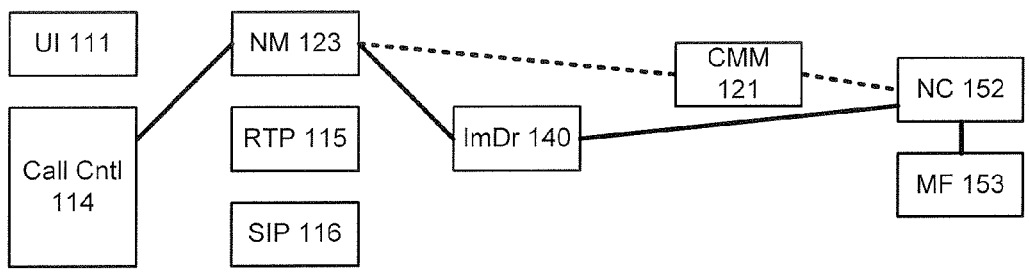
Initiation – Probe Peer    FIG. 8
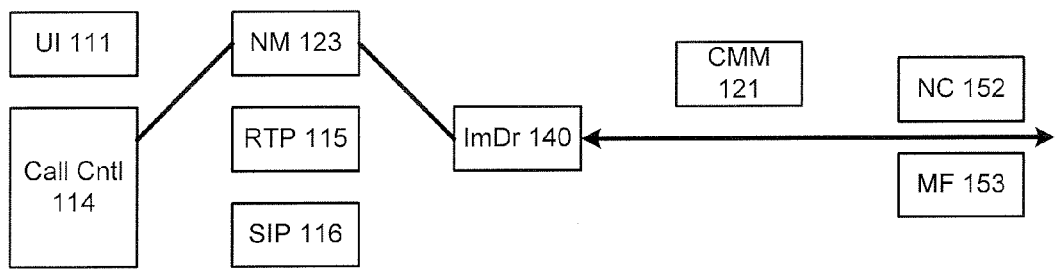
Initiation – Private UDP Punch    FIG. 9
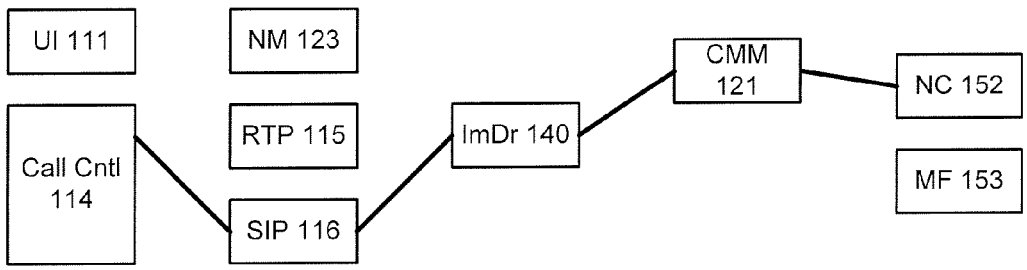
Initiation – SIP Invite, Ringing, Okay, Ack    FIG. 10
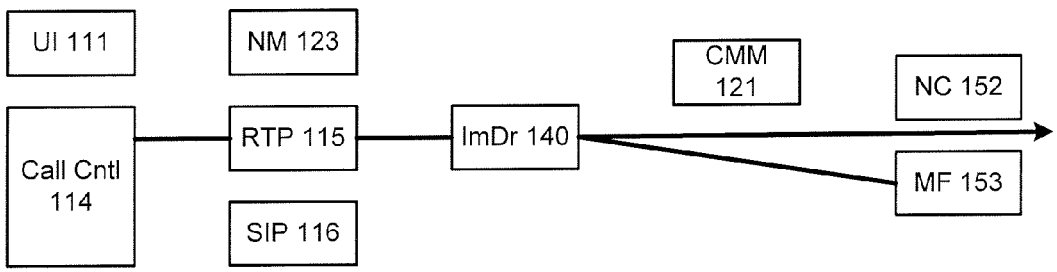
RTP Transport via UDP    FIG. 11

FIG. 14 Receive – On-net, UDP blocked

Initiate – No NAT, UDP allowed

Initiate – Cone NAT, UDP allowed, on-net and off-net cases

Initiate – Symmetric NAT, UDP allowed, on-net and off-net cases

Receive – On-net, with Symmetric NAT     FIG. 21

Mobility Algorithm

SESSION INITIATION AND MAINTENANCE WHILE ROAMING

BACKGROUND OF THE INVENTION

The technology disclosed addresses initiation of peer-to-peer media exchange sessions, with traversal of NAT and firewall devices, in a manner adapted to roaming. In particular, it involves preliminary determination of NAT/firewall topology, which reduces latency at initiation, and hole punching technologies to select a routing and traversal strategy that reduces reliance on external media relay devices.

Communicating media over IP is a versatile and cheap option. It is versatile because personal computers, set-top boxes and similar computing devices have screen and processing resources that plain old telephone system (POTS) handsets do not. In this sense, cell phones are small computing devices that have pre-configured feature sets or may be user upgradeable (especially cell phones that run the Palm or Microsoft CE operating systems.) Communication over IP is cheaper and faster than incumbent POTS networks. The realities of versatility and low price have propelled voice over IP (VOIP) to the forefront, along with video and multimedia delivery over IP.

Mobile VOIP is typically thought of as wireless, although hotels often provide wired connections that are privately managed, in addition to wireless. Roaming users with mobile VOIP devices almost immediately confront privately managed, legacy network devices, including NAT and firewall devices, which are designed to thwart the traffic patterns that support peer-to-peer connection over IP. Some firewall devices block unreliable transport protocols, including UDP packets, which are the preferred transport for media delivery. Firewalls typically block session initiation requests from outside sources. Essentially, firewalls block incoming calls. Attempts of outsiders to open sessions are thwarted by NAT devices, which are otherwise intended to share limited IP address space. NAT devices, in concept, share one or a few IP addresses and multiple port numbers among many intranet users who have non-routable IP addresses and may all be seeking to use the same port number. Internal IP addresses and port numbers are mapped to NAT-assigned external IP addresses and port numbers ("IP/port addresses"). NAT devices, in practice, obscure the port number that will be assigned to a particular intranet user. Some styles of NAT devices, such as the so-called full cone NAT's, allocate external port numbers to intranet users in a predictable fashion. Other styles of NAT devices, such as the so-called symmetric NAT, allocate external ports in a pattern that is unpredictable to any particular intranet user. The combination of privately managed, legacy network NAT and firewall devices presents a substantial challenge for a roaming user.

NAT and firewall traversal present issues that attracted much attention and a series of methodology proposals from the Internet Society's Internet Engineering Task Force (IETF). The many specifications produced by the IETF for traversal of NAT include STUN, ICE, rport, symmetric RTP, TURN, SIP Outbound, SDP attribute for RTCP, and others. An overall discussion of work by IETF is found in C. Boulton, Ed., J Rosenberg, G. Camarillo, "Best Current Practices for NAT Traversal for SIP", draft-ietf-sipping-nat-scenarios-05 (Jun. 26, 2006), viewed at http://www.ietf.org/internet-drafts/draft-ietf-sipping-nat-scenarios-05.txt on Sep. 30, 2006. The best current practices document identifies itself as giving the overall context for how NAT traversal efforts should utilize the IETF specifications. Id. at 3, section 1.

Early traversal proposals included J. Rosenberg et al., "STUN—Simple Traversal of User Datagram Protocol (UDP) Through Network Address Translators (NATs)" RFC 3489 (March 2003) viewed at http://www.ietf.org/rfc/rfc3489.txt?number=3489 on Sep. 30, 2006, and "Traversal Using Relay NAT (TURN)", draft-rosenberg-midcom-turn-08 (Sep. 9, 2005) viewed at http://tools.ietf.org/html/draft-rosenberg-midcom-turn-08 on Sep. 30, 2006, which evolved into "Obtaining Relay Addresses from Simple Traversal of UDP Through NAT (STUN)" draft-ietf-behav-turn-01 (February 2006) viewed at http://www.ietf.org/internet-drafts/draft-ietf-behave-turn-01.txt on Sep. 30, 2006. An early consolidation of traversal proposals appeared as J. Rosenberg, "Interactive Connectivity Establishment (ICE): A Methodology for Network Address Translator (NAT) Traversal for the Session Initiation Protocol (SIP)", draft-rosenberg-sipping-ice-01 (Jun. 30, 2003) viewed at http://tools.ietf.org/html/draft-rosenberg-sipping-ice-01 on Sep. 30, 2006.

The STUN protocol defines a special STUN server in the public address space to return to a STUN client in a private address space information including the public NAT IP address and port being used for a particular session. This proved useful with full cone NAT devices, but not with symmetrical NAT devices. Deficiencies in STUN lead to the TURN protocol proposal, which was designed to solve the media traversal issue for symmetric NATs. TURN relies on a server that is inserted in the media and signaling path, such as in the customer's DMZ or as part of the service provider's network. This server sits outside the firewall and NAT, exposed to incoming calls. This protocol is viewed by some as having serious security implications, as being deficient in support for quality of service (QOS) measures and adding significant complexity to SIP installations.

The ICE protocol builds upon STUN and TURN, producing a very complicated approach. The cumbersomeness of ICE can be seen in "Best Current Practices for NAT Traversal for SIP", supra, section 4.2.1 at pp. 30-40. A single example of implementing the ICE protocol requires 10 pages to diagram and explain. In addition to the latency apparent from the complex messaging diagrams, analysis of ICE reveals that cooperation of firewalls and alteration of the SIP messages protocol, including modifying message flows, are envisioned by ICE. This makes ICE impractical for many users to implement and cumbersome, at best.

Accordingly, an opportunity arises to introduce new architectures and protocols for mobile VOIP and mobile media over IP users. Faster protocols that are relatively easy to implement and generally compatible with incumbent network devices can result.

SUMMARY OF THE INVENTION

The technology disclosed addresses initiation of peer-to-peer media exchange sessions, with traversal of NAT and firewall devices, in a manner adapted to roaming. In particular, it involves preliminary determination of NAT/firewall topology, which reduces latency at initiation, and hole punching technologies to select a routing and traversal strategy that reduce reliance on external media relay devices. Particular aspects of the present invention are described in the claims, specification and drawings.

BRIEF DESCRIPTION OF THE DRAWINGS

FIGS. 2-21 are variations on illustrating communications during operation. FIGS. 2 and 3 depict topology learning in cases where the firewall permits and denies initiation of unreliable transport sessions.

FIG. 4 illustrates probing that takes place when a user requests initiation of a session.

The paths illustrated in FIGS. 5 through 12 and 15 may be helpful in understanding the particular message flows illustrated in the swimming lane diagrams of FIGS. 13-14 and 16-21.

FIG. 5 illustrates the path generally used for SIP registration that follows probing.

FIG. 6 illustrates the particular messages that implement port allocation and SIP registration.

FIG. 7 illustrates the path generally used for setting up a UDP over TCP tunnel when UDP traffic is blocked by the firewall.

FIG. 8 illustrates a path generally used for probing in response to an initiation request, prior to SIP messaging.

FIG. 9 illustrates the path generally used for a private UDP punch.

FIG. 10 illustrates the path generally used for the SIP messages invite and OK.

FIG. 11 illustrates the path generally used for the SIP message ACK.

Figure 12:
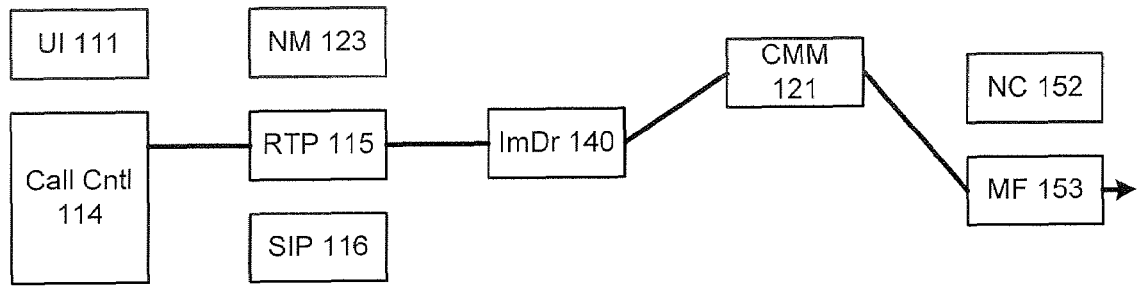

FIG. 12 illustrates the path generally used when UDP traffic is blocked and media packets need to be tunneled via TCP.

Figure 13:
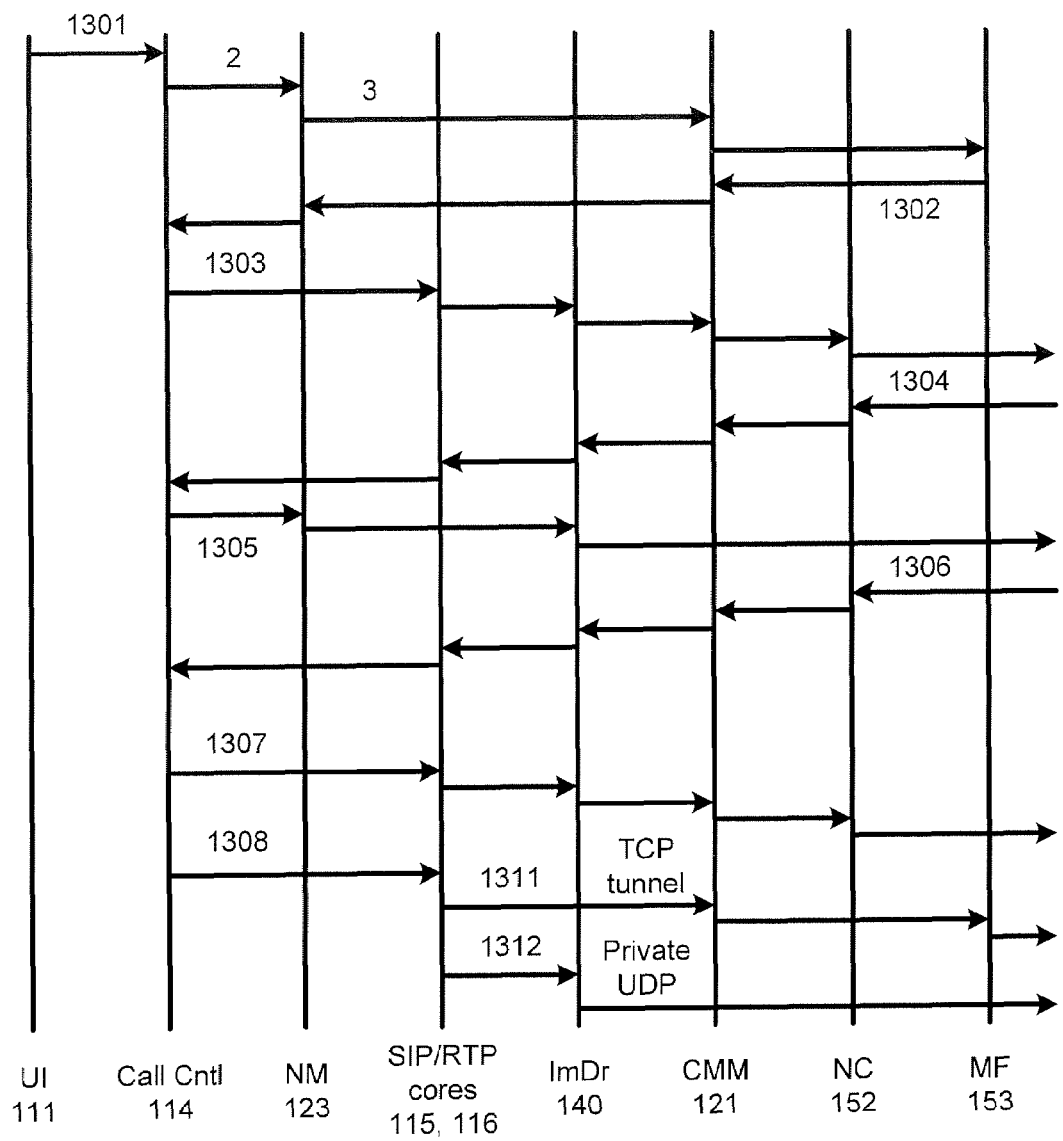

FIG. 13 is a message flow diagram generally illustrating the initiation of the call when UDP session initiation is blocked by the firewall, requiring a TCP tunnel or private UDP punching.

Figure 14:
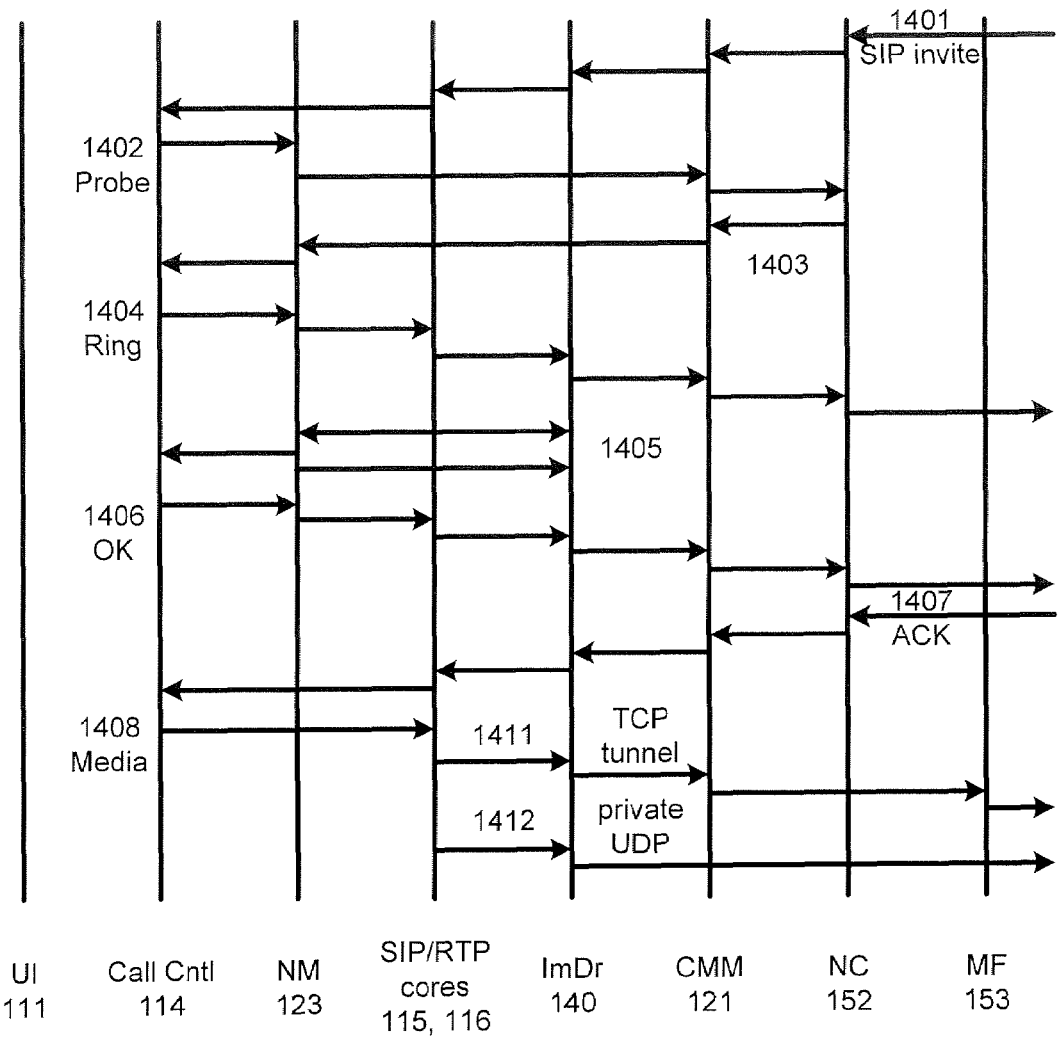

FIG. 14 is a message flow diagram generally illustrating response to initiation of a session by the responding peer device that implements the technology disclosed.

Figure 15:
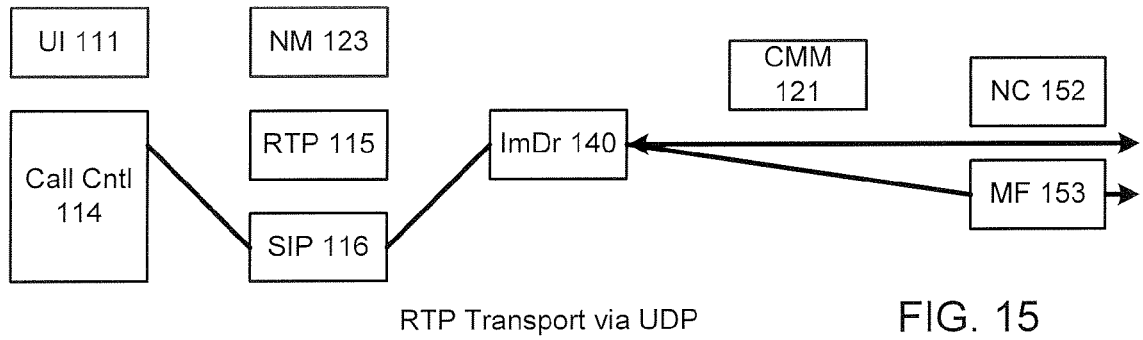

FIG. 15 illustrates the alternative paths used for UDP sessions, depending on whether the session is established directly between the peer devices or through one or more media forwarders.

Figure 16:
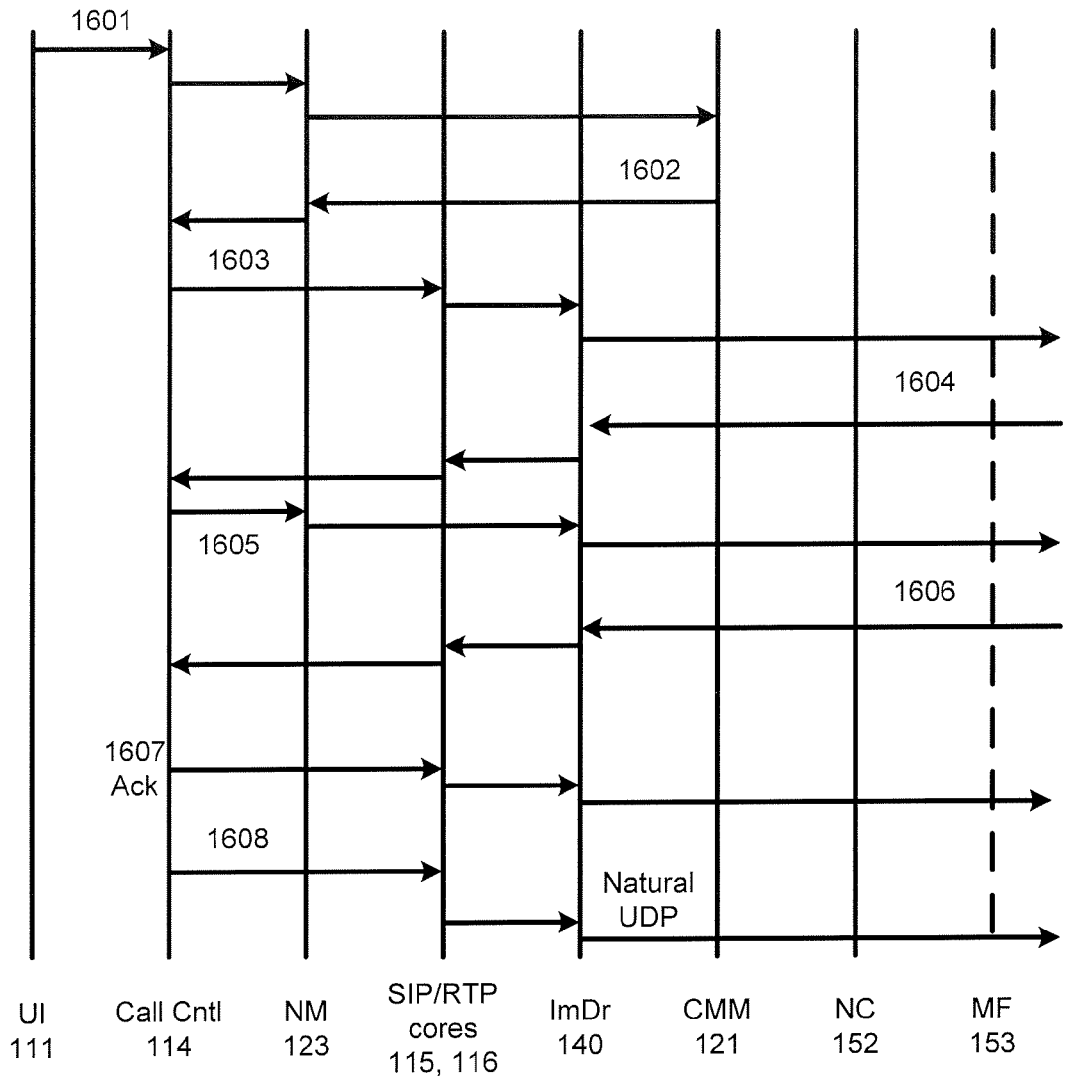

FIG. 16 is a message flow diagram generally illustrating initiation of a call in a simple case where there is no NAT to traverse and UDP is allowed by the firewall.

Figure 17:
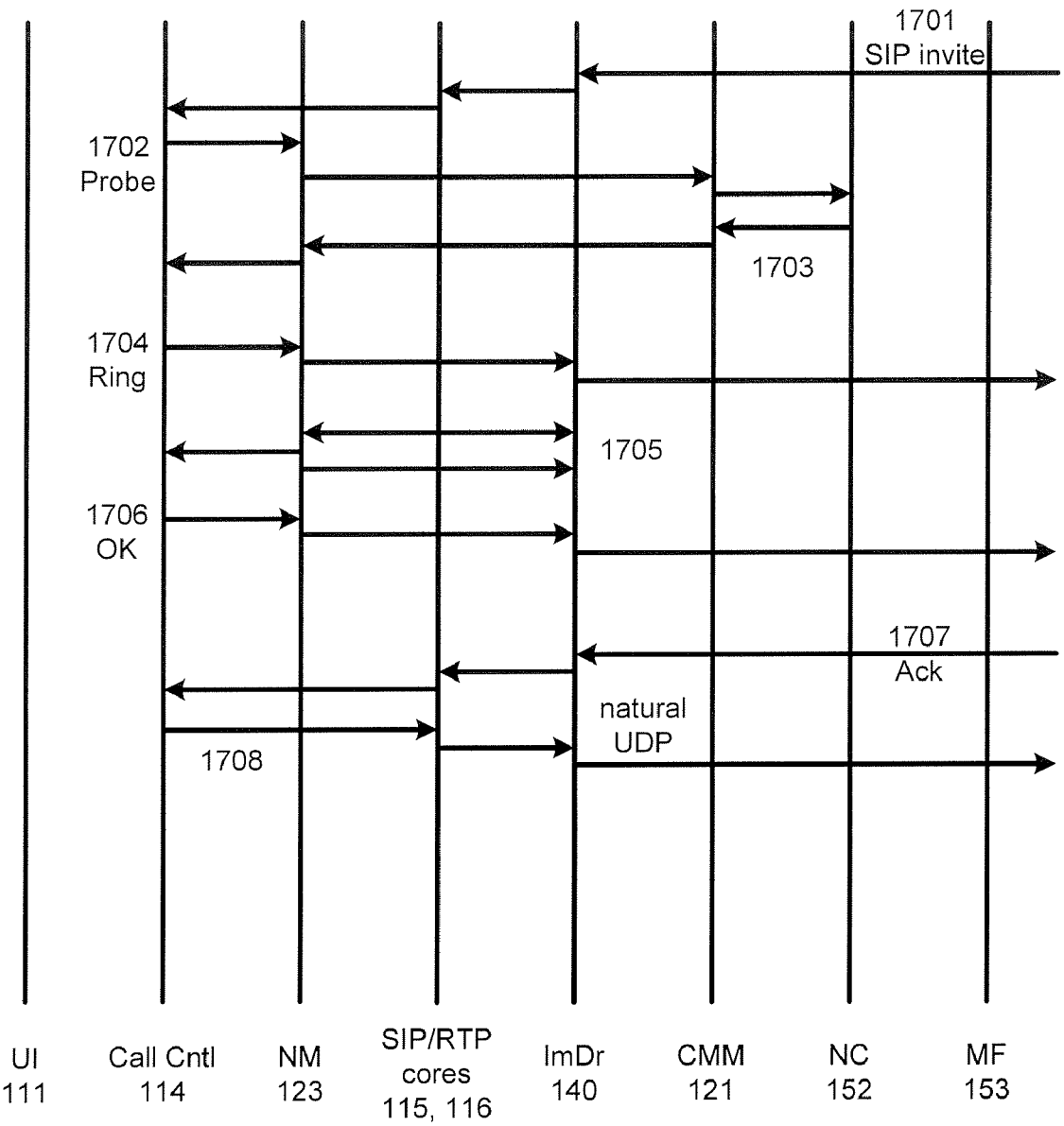

FIG. 17 is a message flow diagram generally illustrating response to initiation of the session in the simple case where there is no NAT to traverse and UDP is allowed by the firewall.

Figure 18:
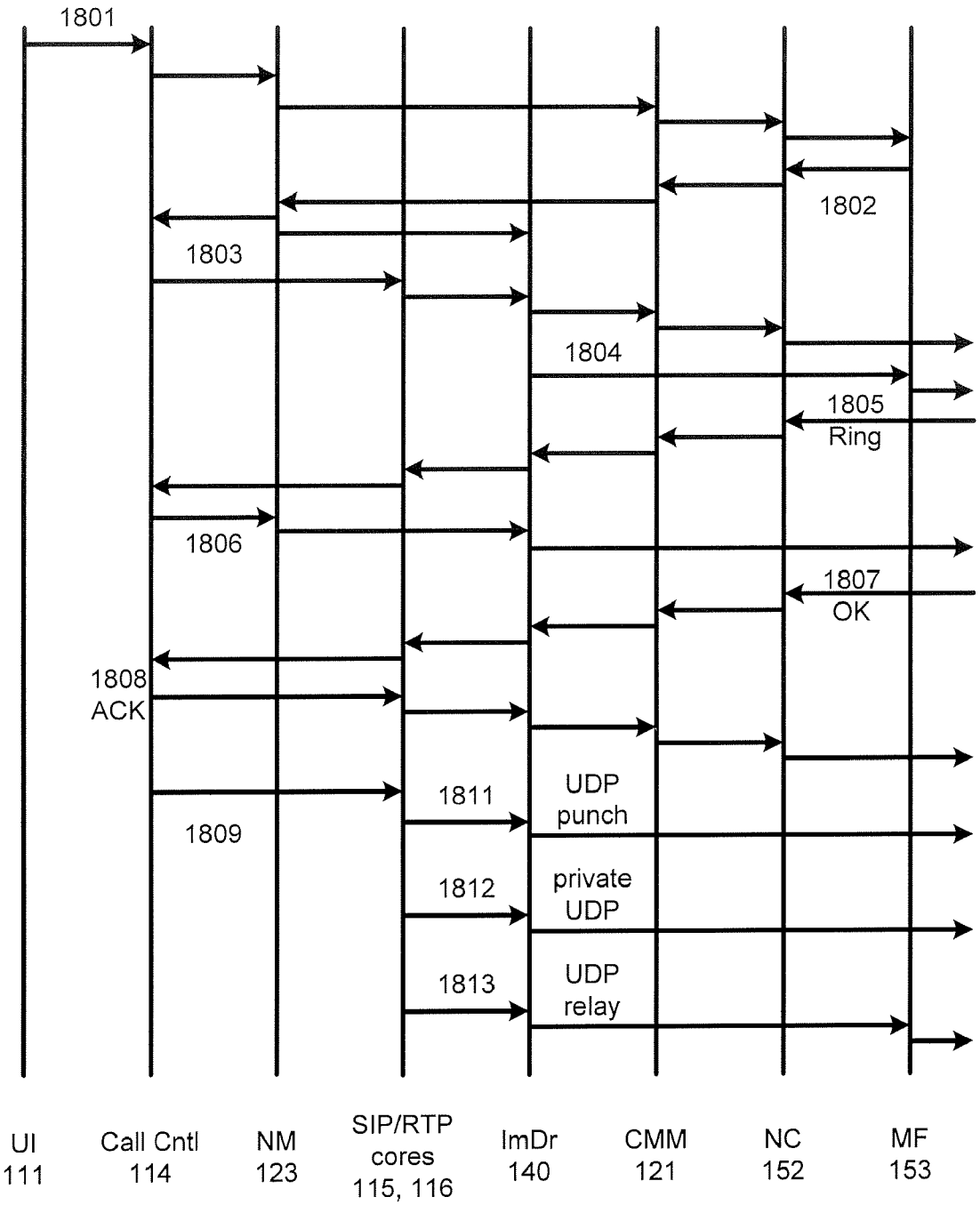

FIG. 18 is a message flow diagram generally illustrating initiation of a call in a case where the NAT device implements a cone NAT and the firewall permits initiation of UDP sessions.

Figure 19:
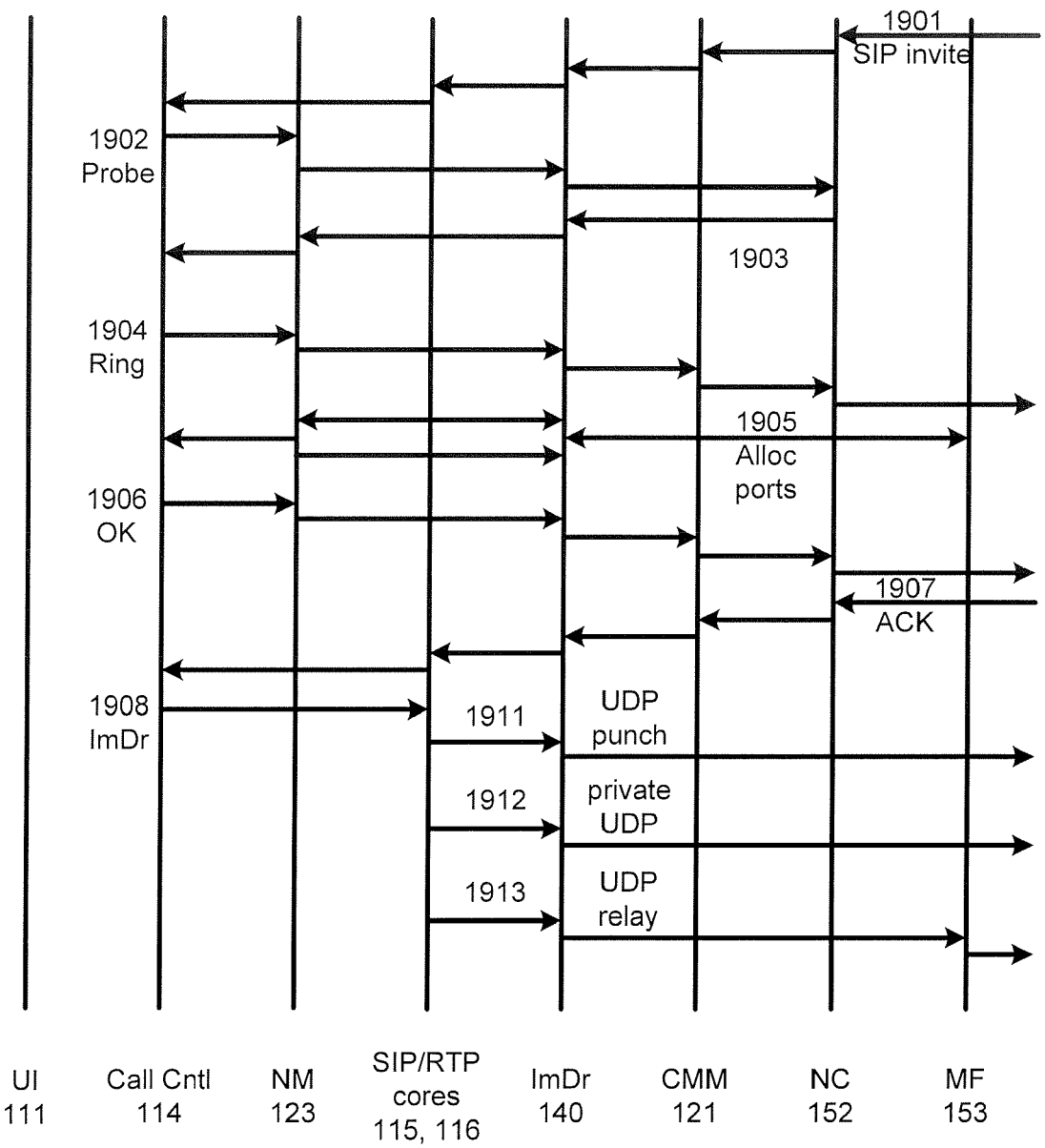

FIG. 19 is a message flow diagram generally illustrating response to initiation of a session when the responding peer device is behind a cone NAT and a firewall that allows UDP sessions.

Figure 20:
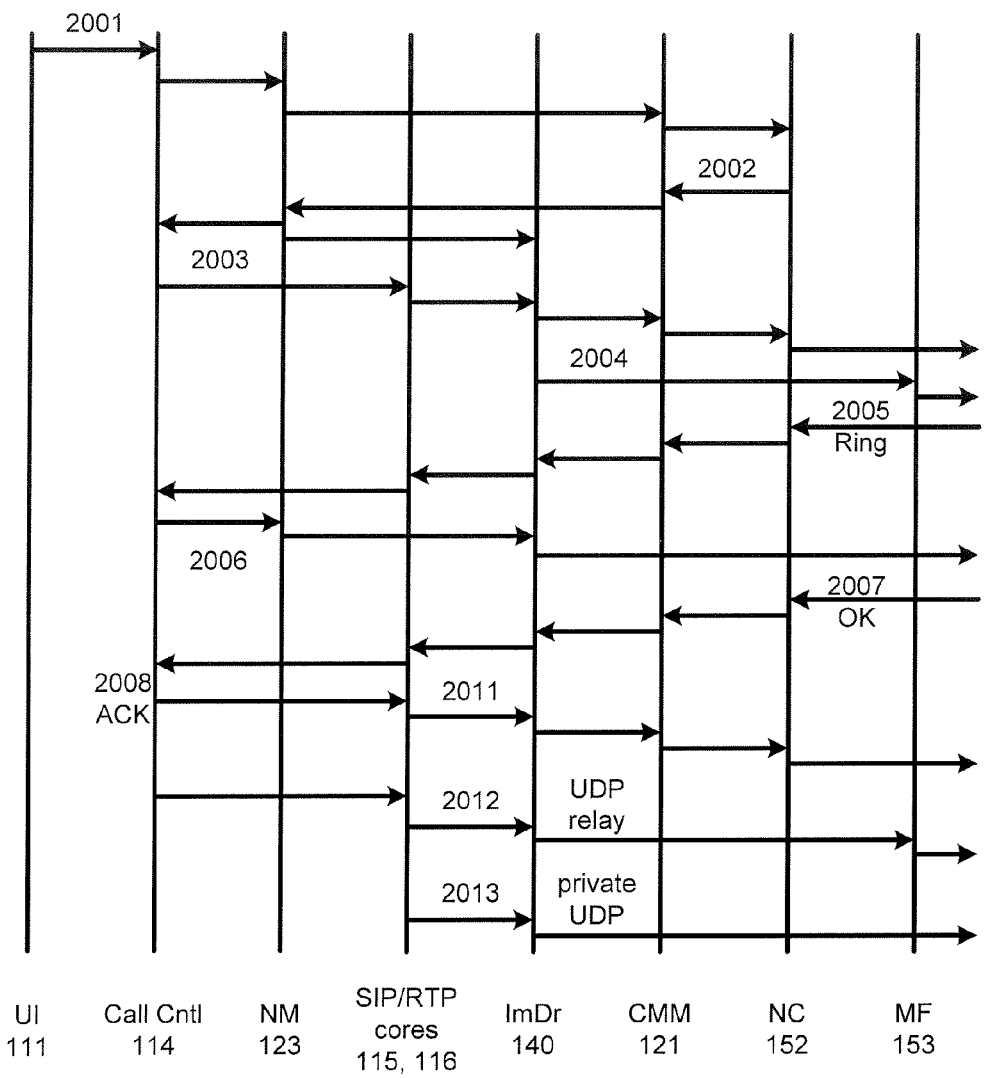

FIG. 20 is a message flow diagram generally illustrating initiating a call in the case where the NAT device implements a symmetric NAT and the firewall permits initiation of UDP sessions.

Figure 21:
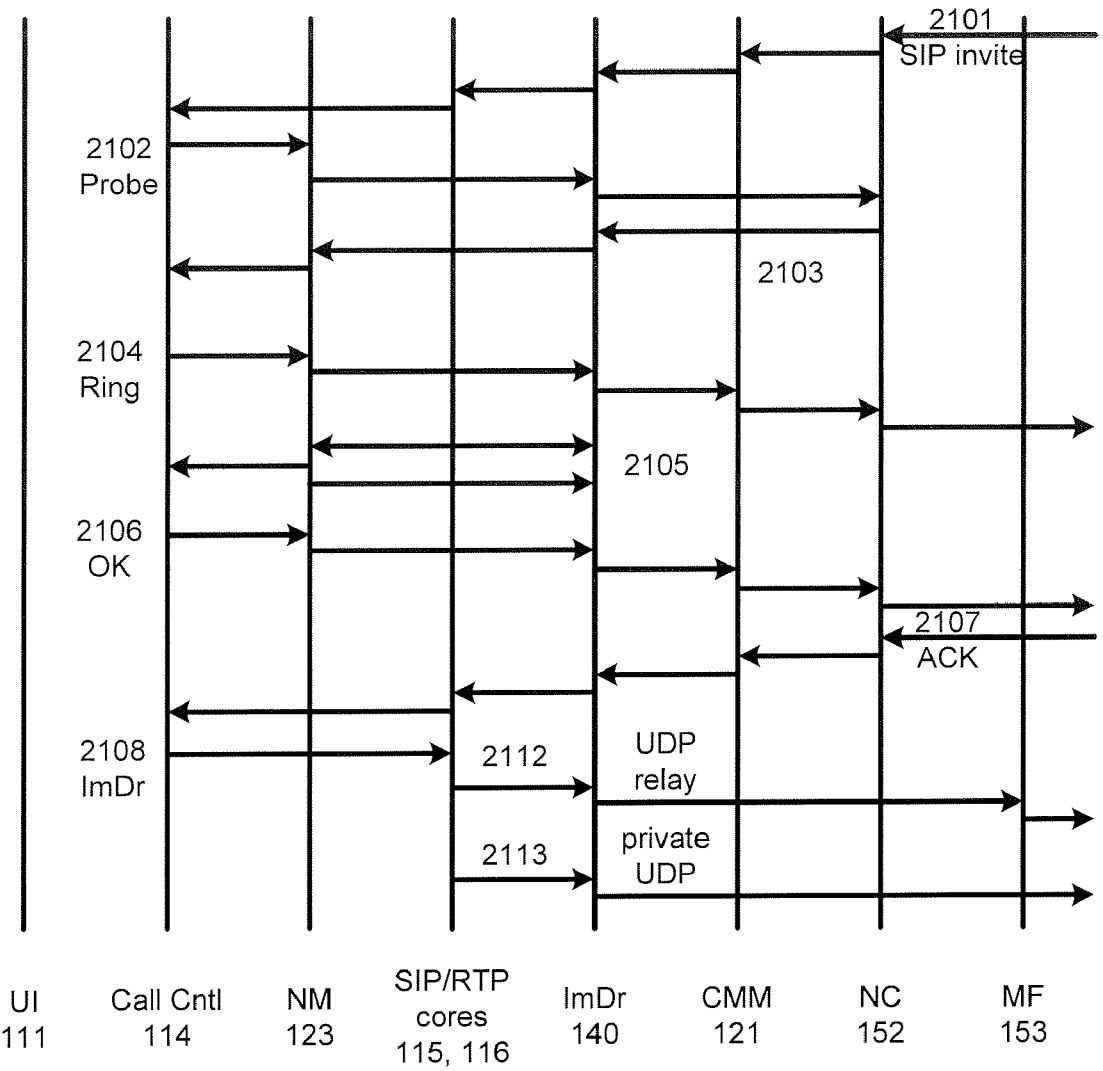

FIG. 21 is a message flow diagram generally illustrating response to initiation of a session when the responding peer device is behind a symmetric NAT and firewall that allows UDP sessions.

Figure 22:
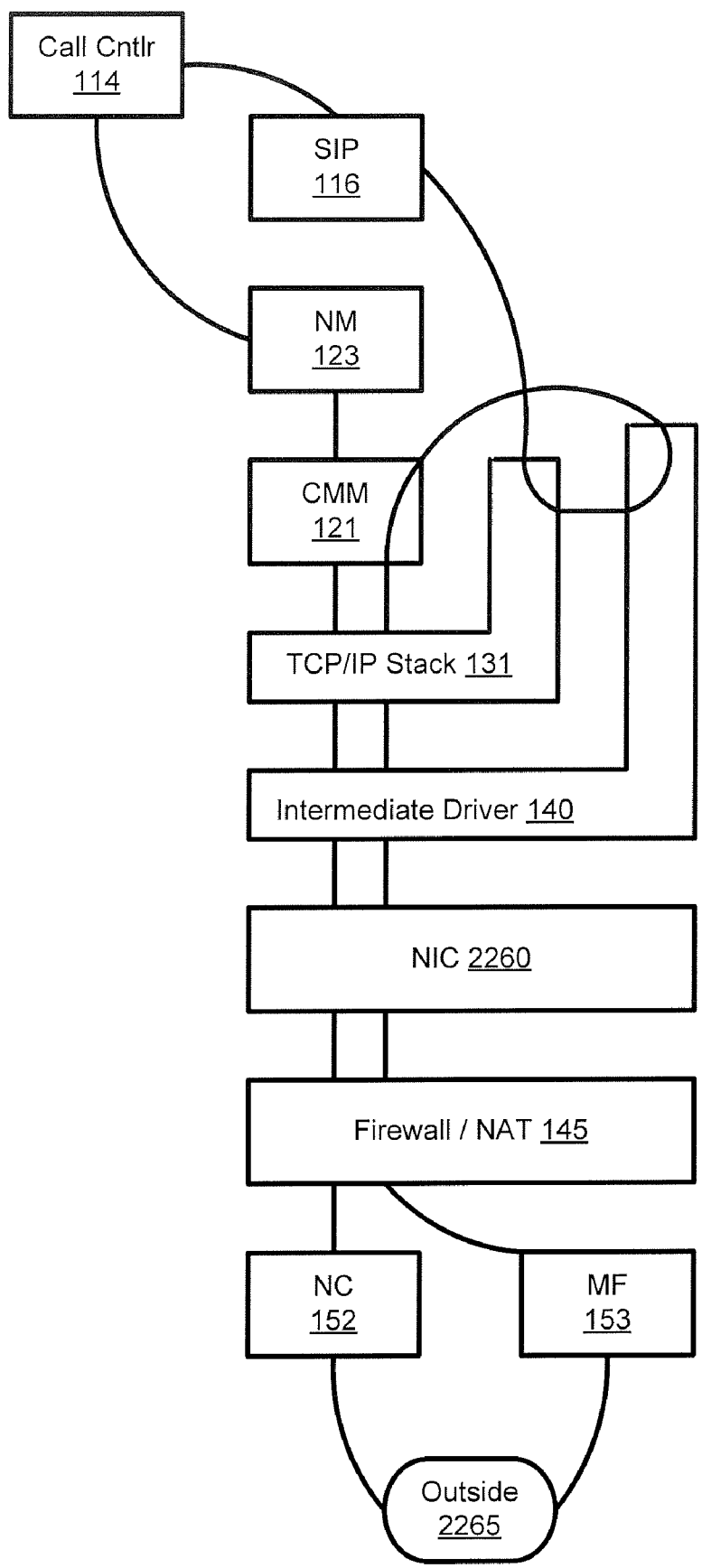

FIG. 22 depicts the relationship among a stack, an intermediate driver and the network adapter or other hardware that ordinarily would interact with the stack.

Figure 23:
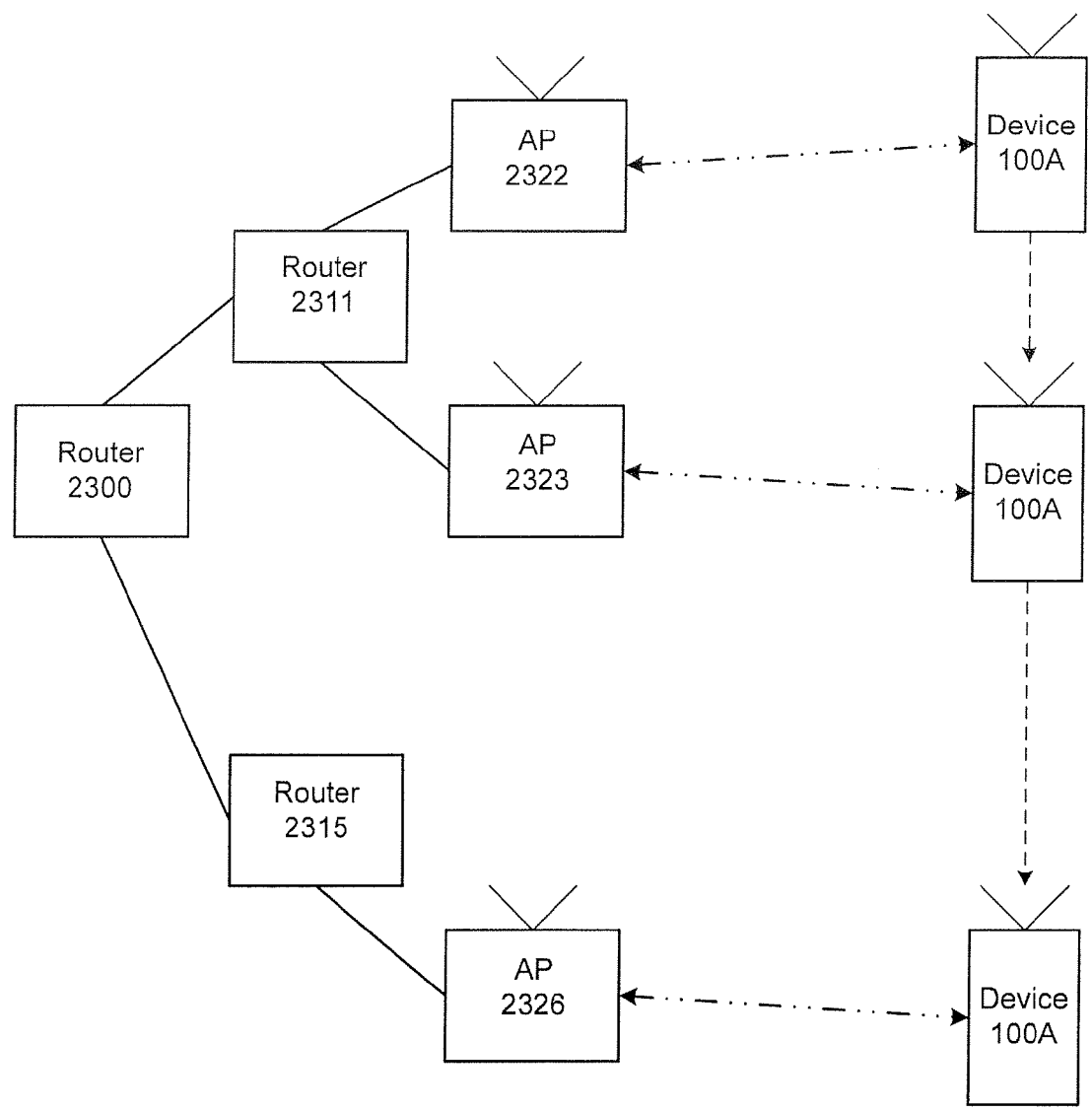

FIGS. 23-31 illustrate features that may be combined in a system that supports mobility of the device among access points, including changing the IP address of the device as it moves, without terminating a media session. FIG. 23 illustrates the movement.

Figure 24:
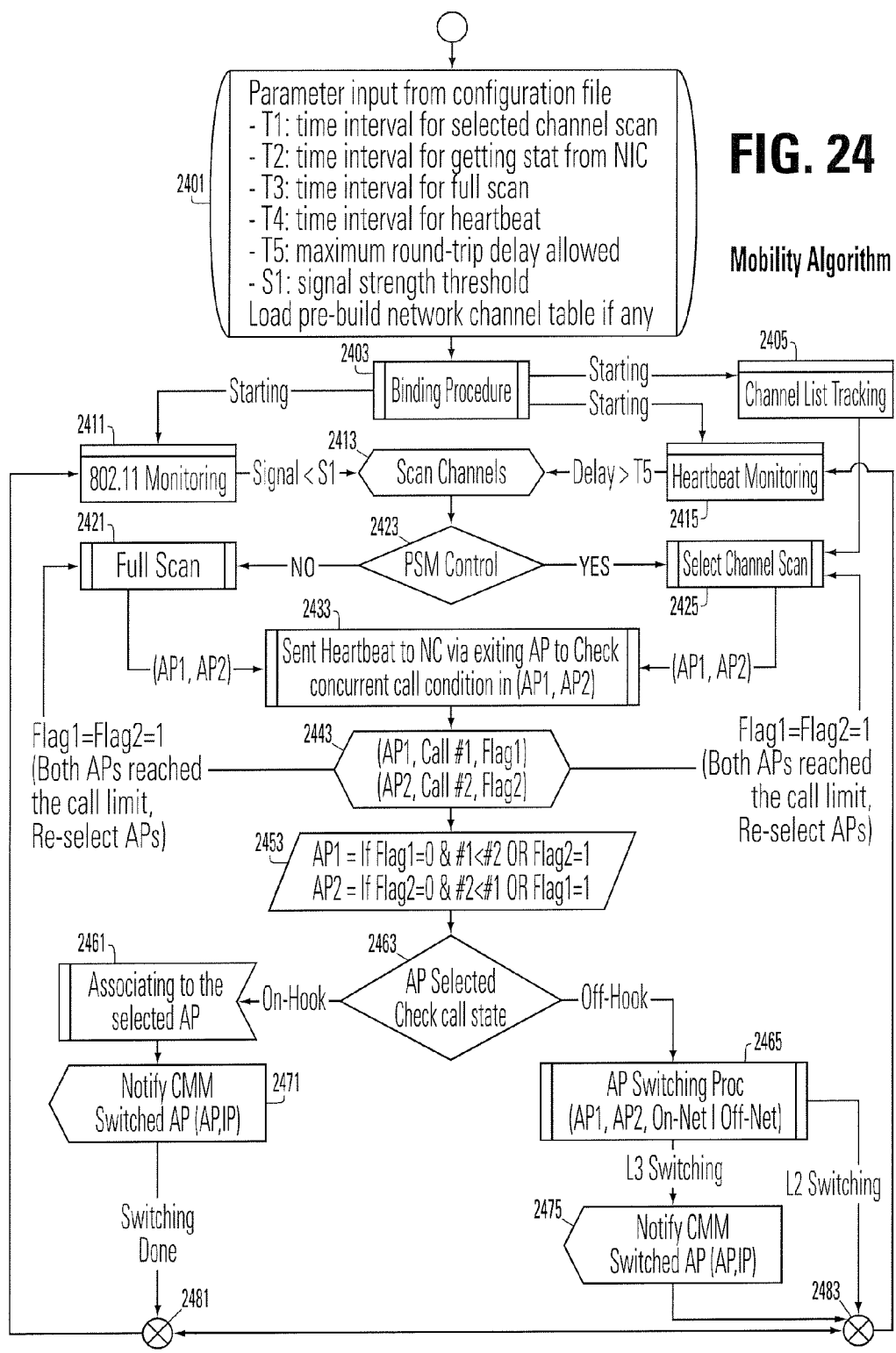

FIG. 24 is a high-level mobility algorithm flowchart.

Figure 25:
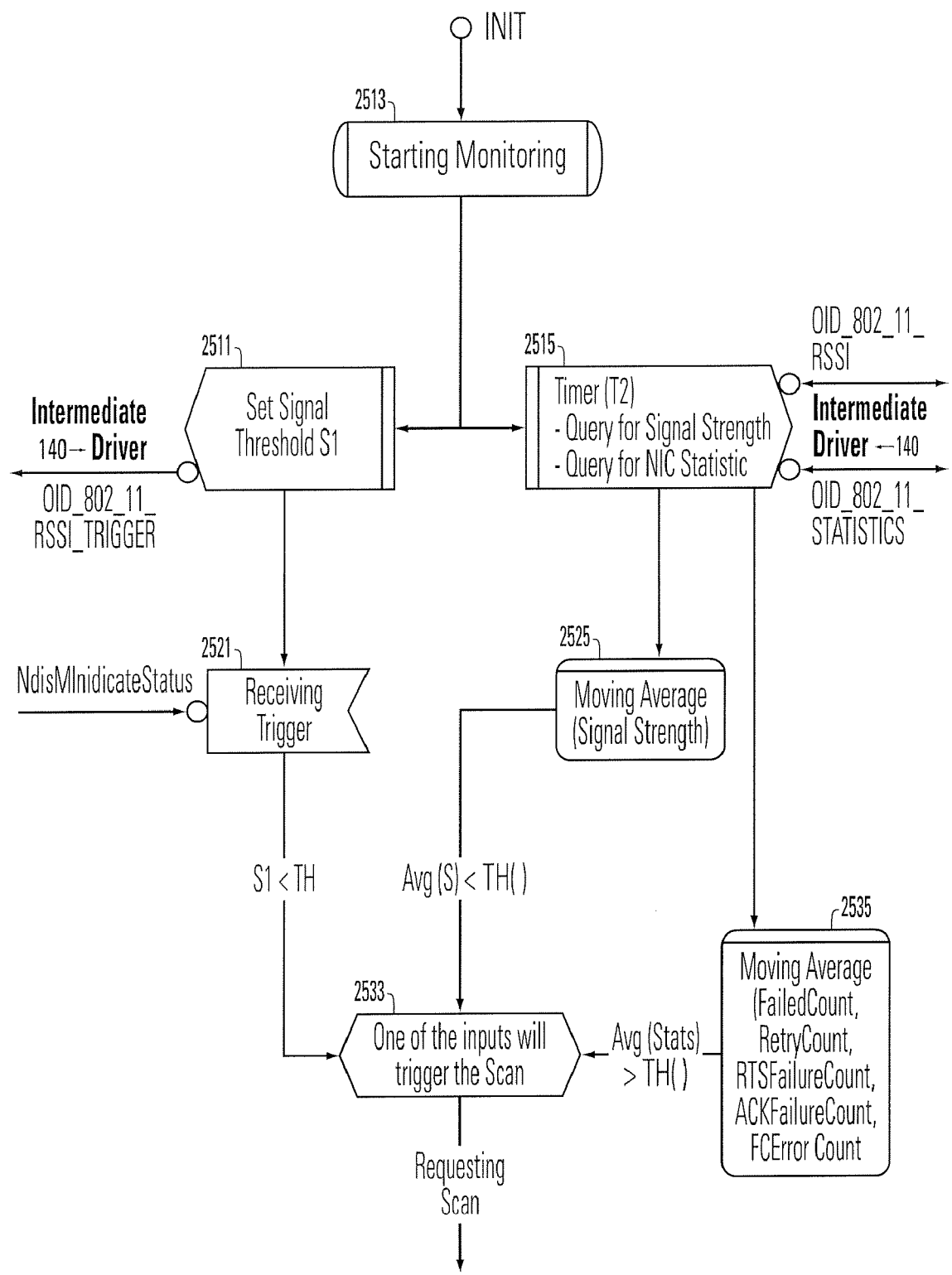

FIG. 25 provides additional detail regarding 802.11 monitoring.

Figure 26:
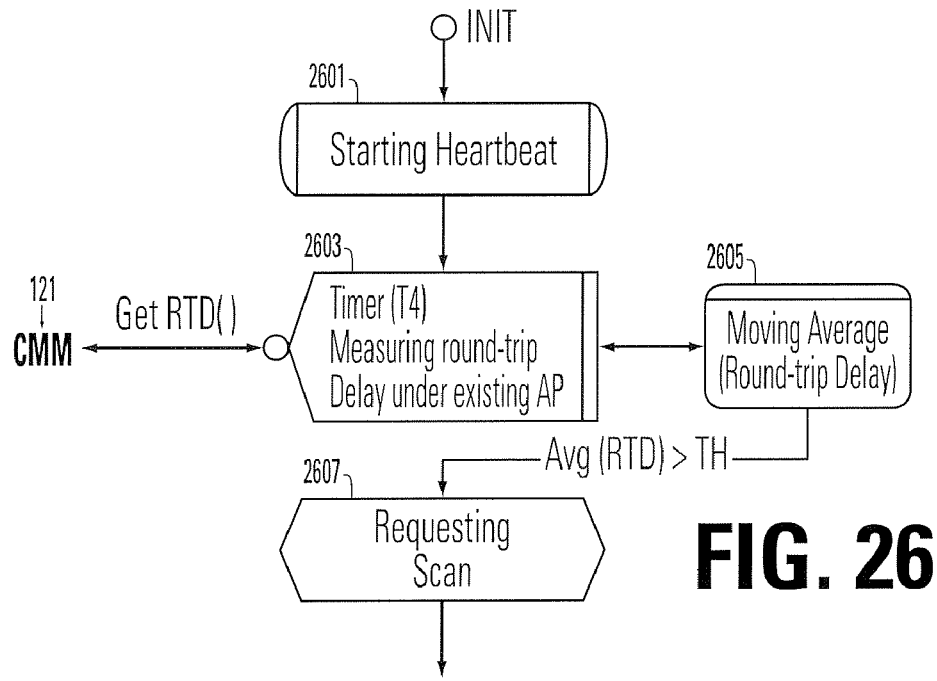

FIG. 26 provides additional detail regarding heartbeat monitoring.

Figure 27:
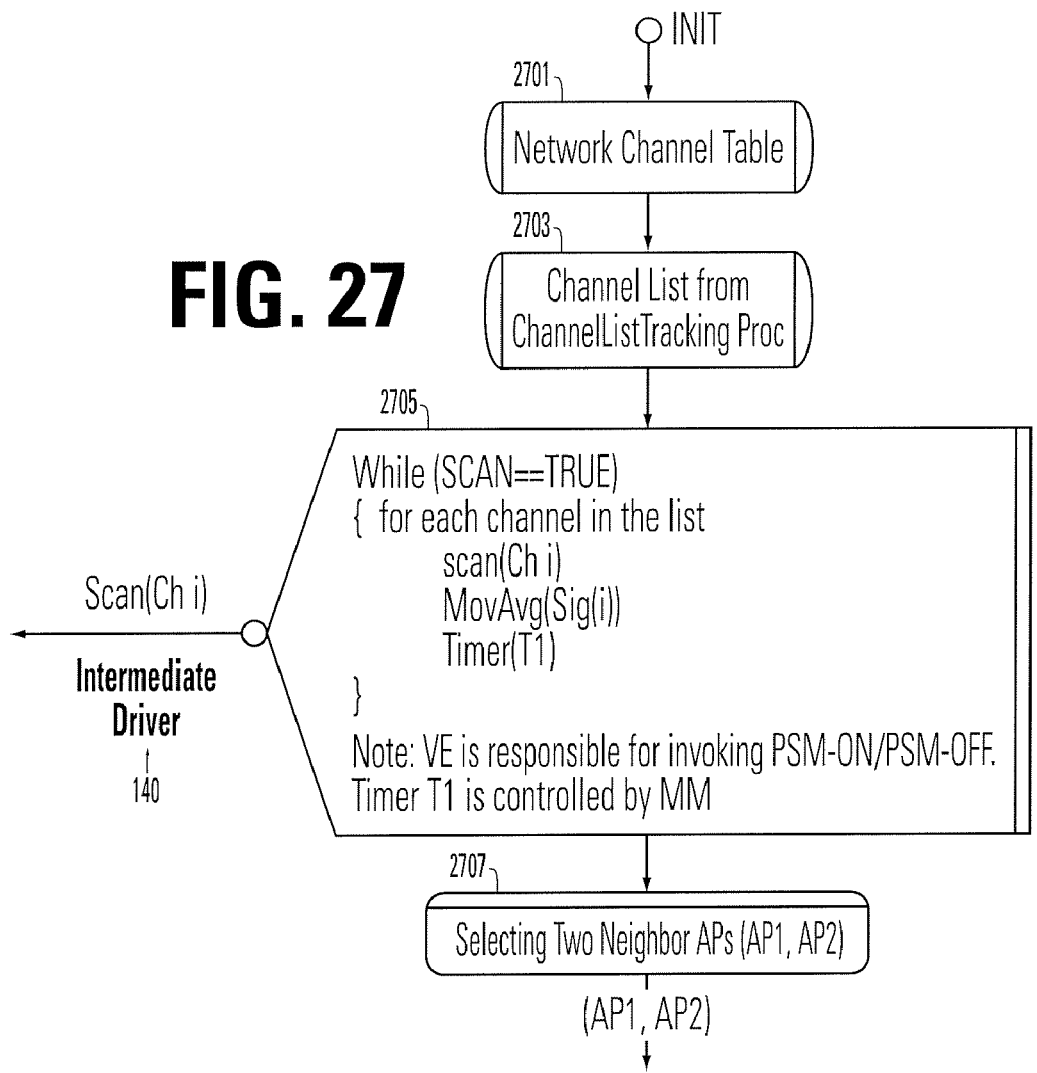

FIG. 27 provides additional detail regarding selected channel scanning.

Figure 28:
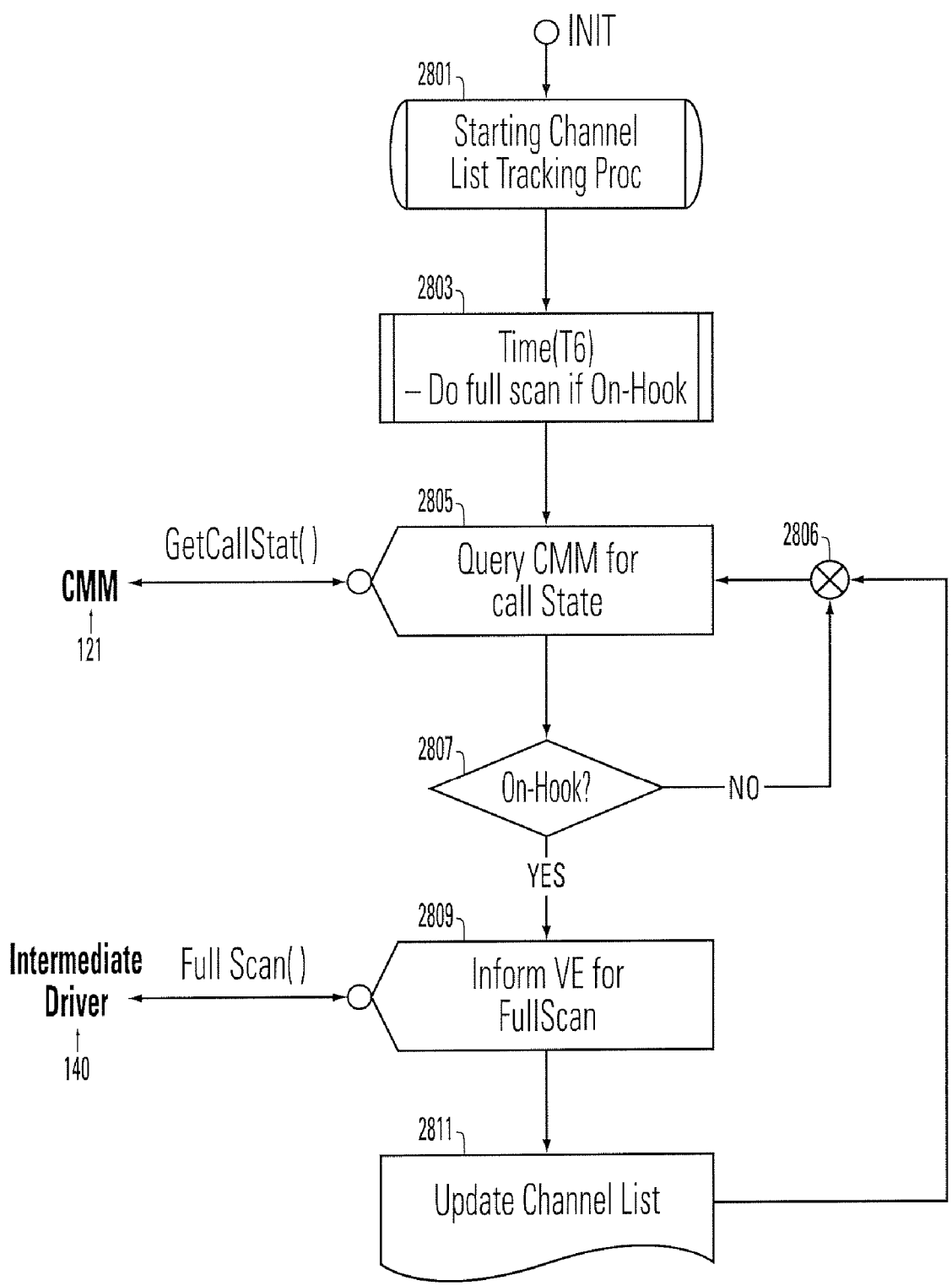

FIG. 28 provides additional detail regarding channel list tracking.

Figure 29:
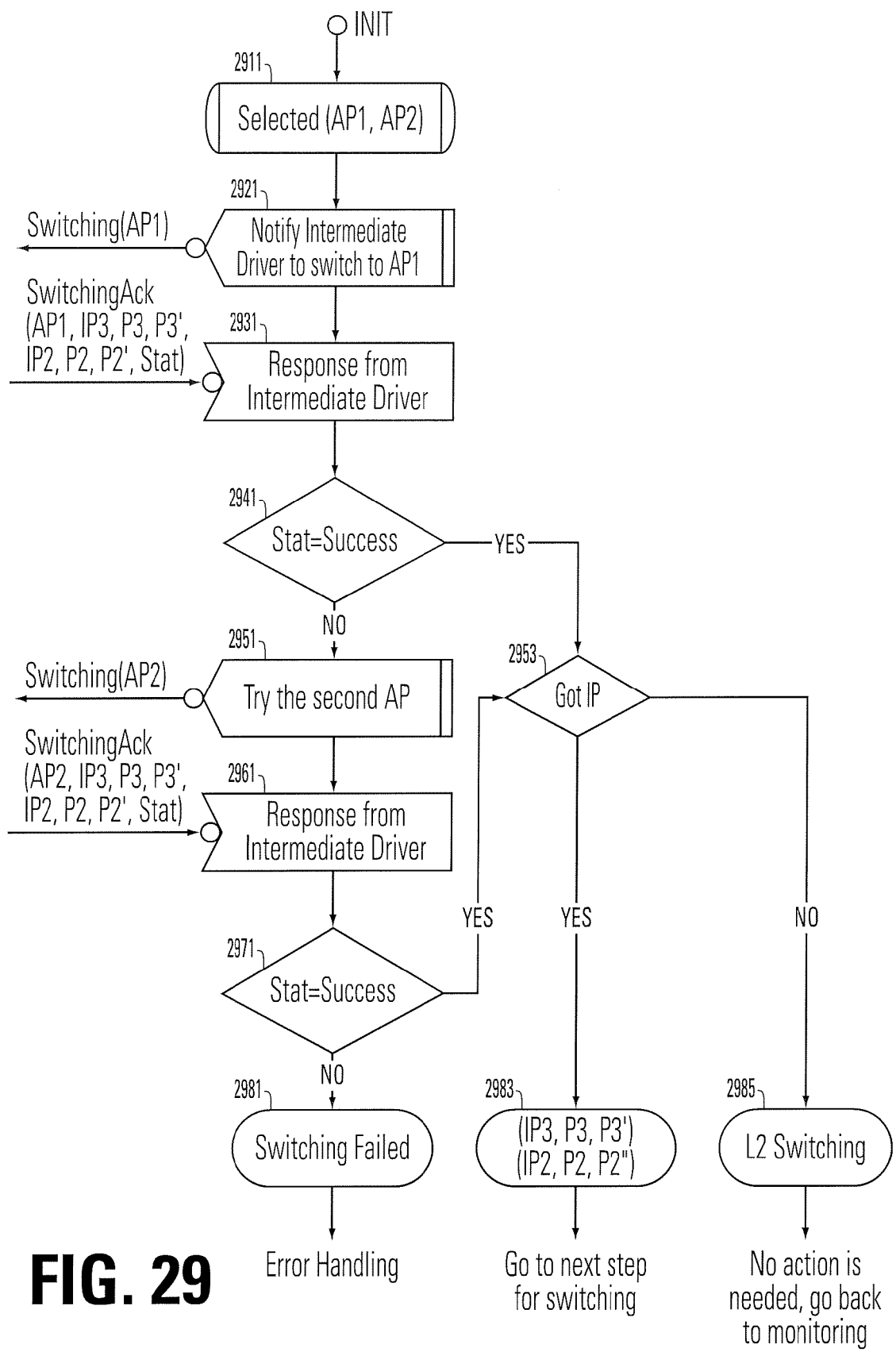
Figure 30:
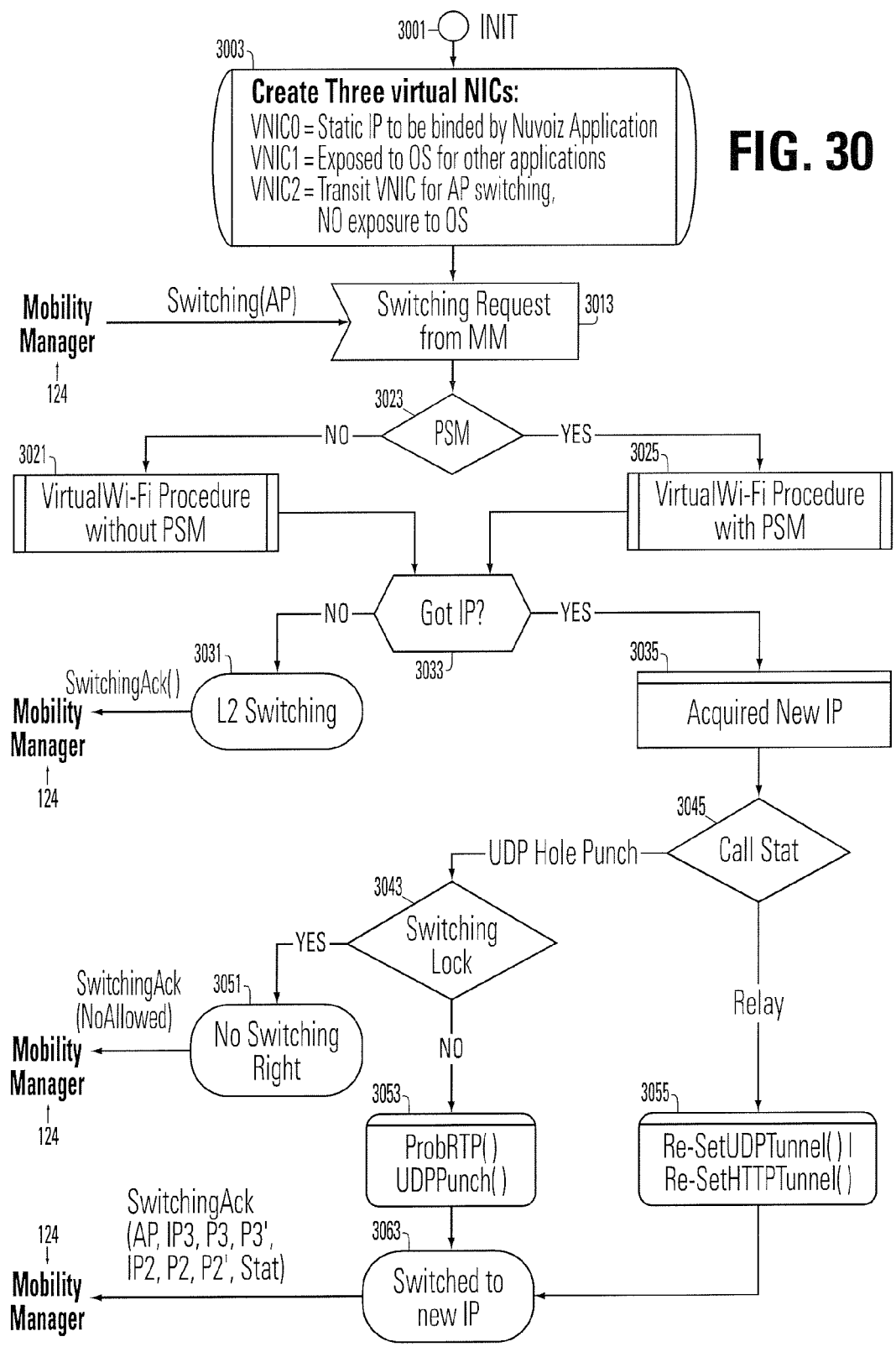

FIGS. 29 and 30 depict access point switching from the perspectives of the mobility manager and the voice over IP engine components.

Figure 31:
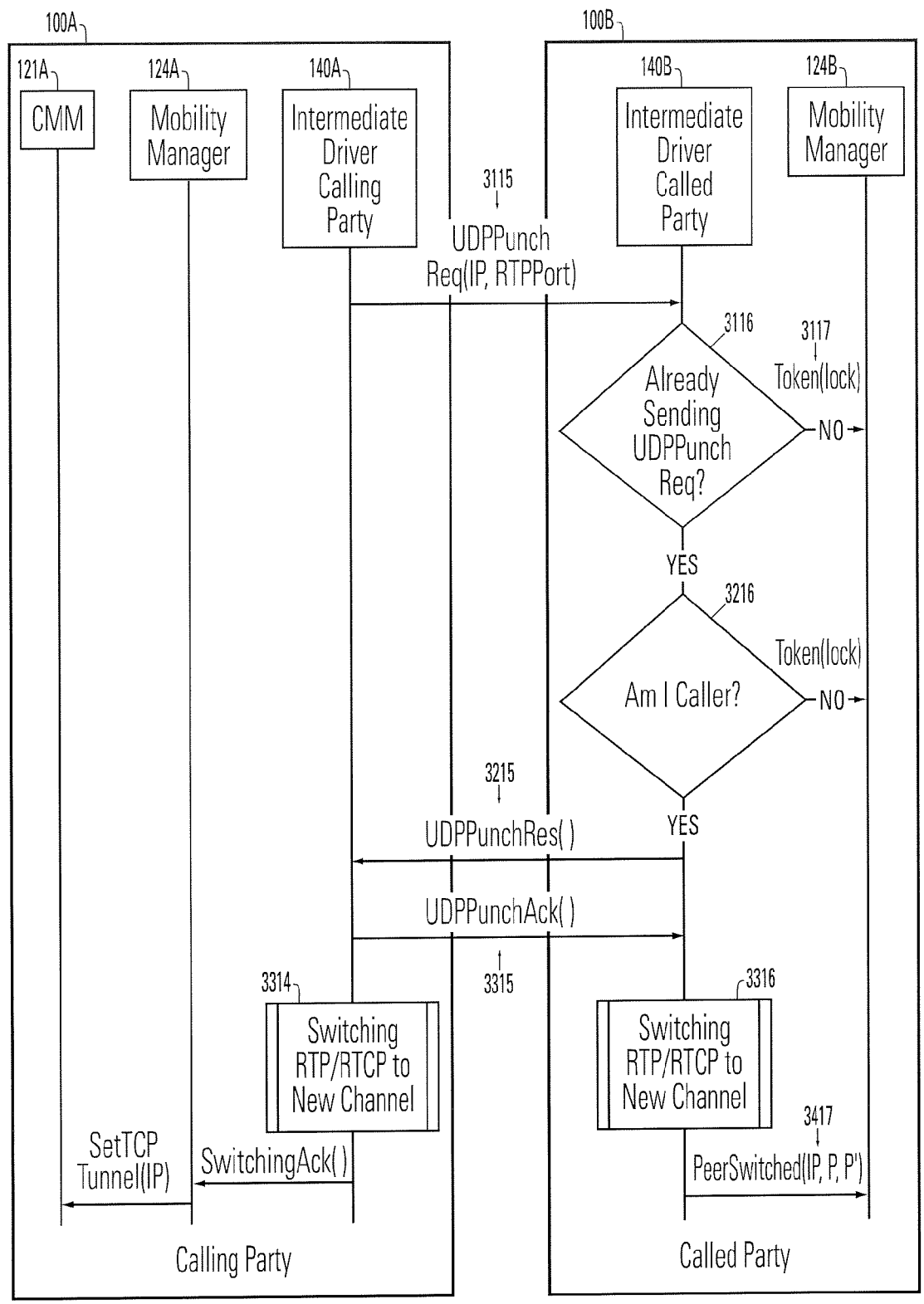

FIG. 31 depicts application of a switching lock.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

According to the Internet Society's RFC 3261, the Session Initiation Protocol (SIP) is an application layer control or signaling protocol for creating, modifying and terminating sessions with one or more participants on a peer-to-peer basis. These sessions may include Internet telephone calls, multimedia distribution and multimedia conferences. They also could include media forwarding, such as from music collections or digital video recorders. SIP is widely used as a signaling protocol for voice over IP communications and video conferences. See, also, Wikipeda, *Session Initiation Protocol* accessed on Sep. 24, 2006 at http://en.wikipedia.org/wiki/Session_Initiation_Protocol (overview and useful links).

Because the traversal problems described above are significant and well-known, part of the SIP call initiation protocol includes identifying a media forwarder device associated with the peer devices, in so-called invite and OK messages. The media forwarder device is positioned in an external address space, where it can be reached without NAT traversal tricks. The media forwarder device can be used to relay media packets between the peers, if traversal fails. Unfortunately, use of media forwarders introduces latency and requires deployment of relay equipment.

Routing Strategy Determination

The technology disclosed below provides an alternative method for reliably establishing peer-to-peer connections, building on the SIP protocol. This technology can be implemented by supplementing the SIP message flow, without breaking incumbent SIP services. As SIP implementation evolves, new features of SIP may complement the framework described. Alternatively, it can be used with another proprietary call initiation protocol, such as the one developed by Skype™. See, e.g., S. Baset and H. Schulzrinne, *An Analysis of the Skype Peer-to-Peer Internet Telephony Protocol*, In Proceedings of the INFOCOM '06 (Barcelona, Spain, April 2006) accessed on Oct. 7, 2006 via http://www1.cs.columbia.edu/~salman/skype/.

Session initiation can be viewed as a progression of stages: network topology discovery, NAT probing, session initiation messaging with supplemental address information provided, hole punching, traversal strategy selection and call in progress. Expanded somewhat, these stages include preliminary, pre-call initiation probing of NAT/firewall topology to eliminate traversal strategies that will not work, responding to a call initiation request by probing for IP/port address information before initiating SIP messages, exchanging internal and external IP/port address information between initiating and responding peer devices in SIP messages, hole punching to discover a feasible route and traversal strategy that avoids relaying media packets through a media forwarder, and selection of followed by communication of the selected route and traversal strategy in a standard SIP message. This general approach may be extended by setting up tunnels or media forwarding relay ports before commencing the exchange of SIP messages, and response to probing for IP/port address information.

Discovery of network topology addresses certain NAT and firewall characteristics of one or more devices positioned between an internal, initiating peer device and an external IP address space, such as the Internet. Topology of interest includes whether the firewall permits initiation of unreliable transport sessions, such as UDP sessions. Also of interest is whether the NAT device opens external ports, corresponding to internal IP/port addresses, in a manner predictable to the initiating peer device. Network topology discovery can take place when a device is initialized and whenever its IP address changes, to reduce call initiation latency. Some conditions, such as blocking of unreliable transport sessions, are detected by a timeout while waiting for a return packet. It can be useful to detect a timeout before as a user requests initiation of a session with a responding peer device. To test assignment of external IP/port addresses by an NAT device, at least two packets are sent to different IP/port addresses of at least one external device that responds by reporting the external IP/port address assigned. Comparison of internal and external IP/port addresses of packets sent to different places facilitates discovery of whether hole punching is likely to succeed and whether some traversal strategies are sure to fail.

NAT probing proceeds responsive to a user's request to initiate a session between an initiating peer device and a responding peer device. One or more NAT probe messages are sent to an external server or network controller before SIP messaging proceeds. The network controller is positioned to be in contact with an SIP server. The network controller reports the external port assigned to the NAT probe message. In this stage, the initiating peer device collects address information that it will load into standard SIP messages.

In some circumstances, the probe message causes the network controller to set up a relay or tunnel to a media forwarder, using unreliable or reliable transport, responsive to detected NAT or firewall characteristics. Allocation of ports on the media forwarder would be reported back to the peer device along with the external IP/port address assigned to the NAT probe message.

SIP messaging typically includes invite, ringing, OK and ACK messages. It is useful to load extra information into these messages, beyond the information specified in the SIP protocol. The initiating peer device loads its internal and external IP/port address information into the invite message. This information may be placed in the message header, in optional fields. It may appear in either the C-line or M-line of the message body. During testing, it was discovered that some existing SIP servers do not support multiple M-lines in the message body. Discarding some of the multiple lines will undermine any method, such as ICE, that depends on multiple lines for testing of alternative traversal strategies. The initiating peer device learns the internal and external IP/port addresses of the responding peer device when it receives the ringing message. Lack of address information in the ringing message indicates that the responding peer device is not equipped to participate in cooperative hole punching. The combination of invite and ringing messages sets up the information needed to proceed with hole punching.

Hole punching refers to peer-to-peer connection and traversal of devices that otherwise might prevent peer-to-peer connections. In the hole punching terminology used in this application, public hole punching refers to cooperative efforts of the initiating and responding peer devices for one peer device to cause an NAT device to open a port by initiating communication with an external server, then listening for the other peer device to send packets directly to the open port, bypassing the external server used to open the port. Private hole punching refers to circumstances when the initiating and responding peer devices can use their internal IP/port numbers to communicate with each other, either because they both sit on the same side of an NAT device or because they share an address space supported by their respective NAT devices, as in a virtual private network (VPN). Similar to private hole punching, a so-called natural UDP connection can be established when the peer devices can be directly addressed as part of an external IP address space, without traversing an NAT.

In one embodiment, the responding peer device evaluates success of hole punching efforts and determines what route and traversal strategy will be used for a particular session. The responding peer device adds to the OK message information indicating what choice has been made. In an alternative embodiment, the initiating device or the two devices in cooperation could choose the route and traversal strategy to be used. The initiating device would report the choice in the ACK message. This would delay the choice and potentially increase the time required to initiate a call. In both embodiments, a choice is made and reported in an SIP message. In another embodiment, a private message could be used in between SIP messages to report a choice made by either the initiating or responding device.

Following the stages of network topology discovery, IP/port address probing, SIP messaging with supplemental address information, hole punching and traversal strategy selection, an SIP-invited media exchange proceeds.

The figures that follow illustrate architectures and operations. The accompanying discussion points out alternative embodiments, aspects of the technology and features that can be combined in various ways.

Figure 1:
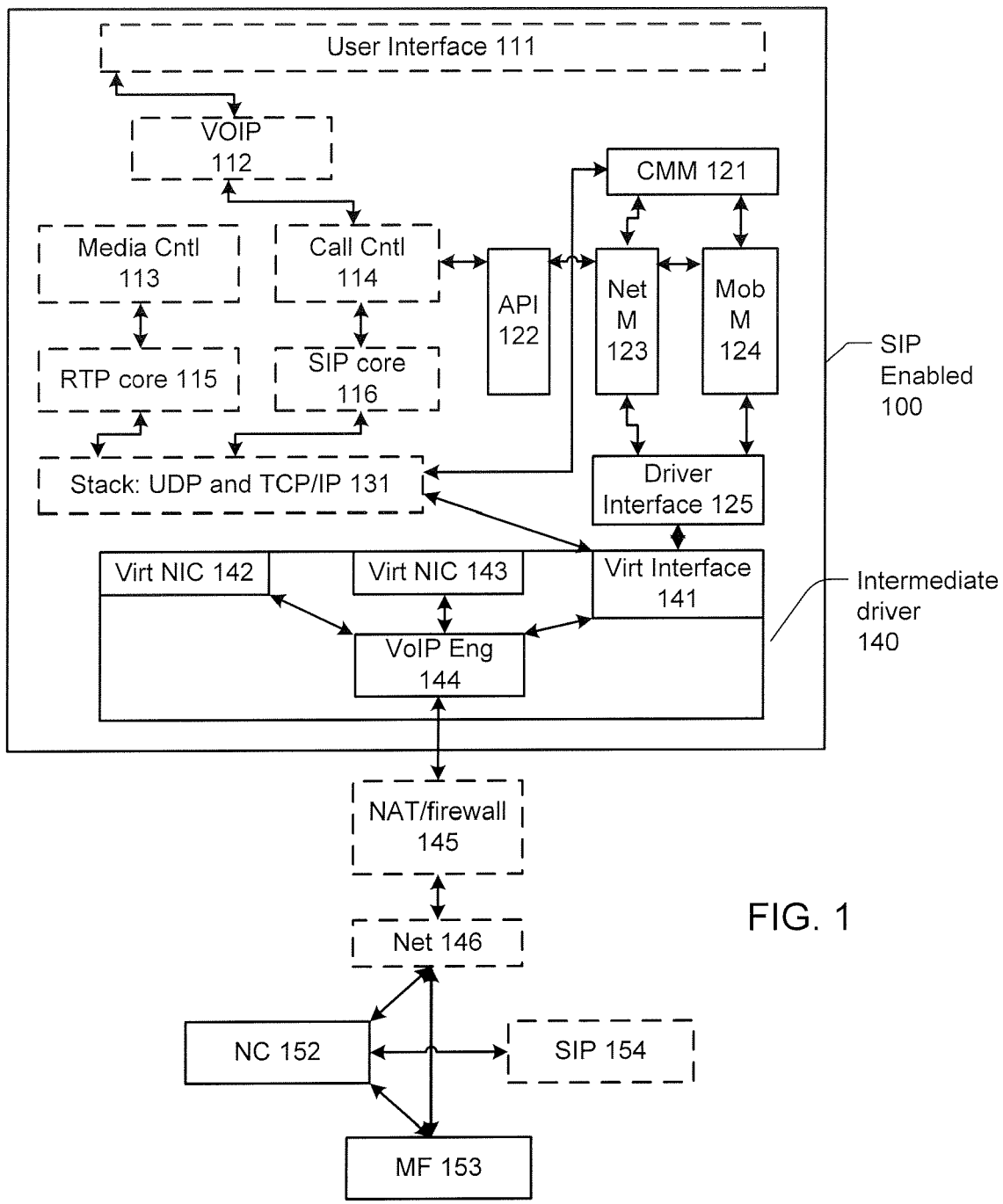
FIG. 1 depicts a driver level architecture.

FIG. 1 depicts intermediate driver architecture. A driver level implementation reduces any need to modify components such as the RTP core 115, the SIP core 116 and the stack 131. (Note that while these reference numbers are introduced in FIG. 1, they are used repeatedly through the remaining figures.) The so-called intermediate driver 140 presents the stack with a pseudo-static IP address, even as the SIP enabled device 100 roams among access points and networks. This intermediate driver is layered between the TCP/UDP stack 131 and the driver that otherwise would interface the stack to the layer 2 (per OSI model) networking hardware. It provides functionality that layer 2 drivers do not provide and builds on the functions supported by layer 2 drivers. The call controller 114 can use an application program interface 122 to take advantage of the technology described. The stack for reliable and unreliable network communications 131, which handles both UDP and TCP/IP sessions, communicates with the intermediate driver interface 141. The complexities of hole punching during session initiation are handled through the application program interface 122. Mobility requirements for roaming are handled by the intermediate driver 140.

FIG. 1 is a high-level block diagram of an SIP enabled device 100 in communication with a network 146 through one or more devices 145 with NAT and firewall functionality. While the device 100 is identified as SIP enabled, it may be enabled to participate in different session initiation protocols, whether for voice over IP, instant messaging, videoconferencing or other media transmission. The user interface 111 in this embodiment is coupled to a voice over IP module 112. Alternatively, it could be coupled to another IP-based communication mode, such as messaging or videoconferencing. The voice over IP module 112 is coupled to a call controller component 114. The call controller is responsible for initiation of a session. The call controller 114 interfaces both with an application program interface (API) 122 and core code for call initiation or SIP initiation 116. Media controller 113 interfaces with an RTP core 115 which is responsible for flow voice or other media. The RTCP functions are handled by the RTP core. RTP stands for real-time transport protocol. RTCP stands for real-time transport control protocol. The SIP core 116 sets up the call. The RTP core 115 conducts the call. The functions of these cores are supervised by the call controller 114 and media controller 113, respectively. Communications with an outside network are handled through a stack 131, for both UDP/media sessions and TCP/control information sessions.

The device 100 and the cooperating network controller 152 and media forwarder 153 are essentially half of a system. The network 146 and SIP server 164 are infrastructure. The device 100 can be either the initiating or responding peer device. A similar device that either implements the disclosed technology or does not implement the disclosed technology is the other half of the system, the other peer device.

The application program interface 122 is coupled to the network manager 123, which interacts with the mobility manager 124, the client messaging manager 121 and, through the device interface 125 and intermediate driver interface 141, with the intermediate driver 140. The network manager 123 allocates tasks to the other components. Discussion of the tasks allocated to the mobility manager 124 is deferred until later. This discussion focuses on interactions through the client message manager 121 and the intermediate driver 140.

In this embodiment, the intermediate driver 140 is implemented as a virtual interface 141, a pair of virtual network interfaces 142, 143 (NICs) and an intermediate driver 140. As will be explained in the context of mobility, virtual NIC 142 and virtual NIC 143 may share a single radio and conduct handoffs as the device 100 moves from one access point to the next. Those of skill in the art will recognize that a roaming device 100 is often implemented with a wireless connection. Wireless telephones, for instance, are expected to roam from one place to the next. In an 802.11 or other IP-based network, this means passing from one access point to the next and often involves a change in the assigned IP address. To maintain a session and avoid dropping a call, a handoff needs to be conducted seamlessly. Alternatively, device 100 may be a soft phone running on a stationery general purpose computer with a wired or wireless connection, in which case only one virtual NIC 142, 143 would be needed.

One or more devices with NAT and/or firewall functions 145 are illustrated. We refer to one or more devices because the packaging of NAT and firewall functionality is undergoing development. The NAT/firewall functionality is illustrated as being on an external device 145 because, if it were integrated into the device 100, it probably would be tuned to avoid traversal issues. Those familiar with the art will recognize that a device 100 may well be located behind layers of NAT devices. For instance, in a home environment, the service provider may dynamically assign non-routable IP addresses to homes using a service provider level NAT configuration. A particular home may share the assigned IP address among the families' computers using an additional NAT device. Most often, NAT devices also provide DHCP functionality to dynamically assign IP addresses. As for firewall functionality, multiple layers of firewalls also may be operative. Some operating systems such as Windows XP currently have firewall functionality built in, which may be enabled or disabled. Many NAT devices combine NAT, DHCP and firewall functionality. In a home environment, for instance, a cable router may accept a cable input, provide NAT, DHCP and firewall functions, and combine wired and wireless physical layer distribution for home computers.

The NAT/firewall device 145 is illustrated as interfacing with a network 146. This network may be the Internet, a corporate network, a service provider's network or another network. Of particular interest are the emerging wireless service provider's networks in municipalities. Mountain View is one of the first communities in which a service provider offers free wireless network access. To facilitate interfacing with a municipal wireless or other service provider network, the device 100 may be equipped with a browser that supports logon and/or advertising.

Two devices described as part of this technology are a network controller 152 and a media forward 153. The SIP server 164 is typically an incumbent device. The technology described can be implemented weaving the SIP server 164 unmodified or combining the network controller 152 with the SIP server 164. The media forwarder 153 cooperates with the network controller 152.

The network controller 152 acts as a rendezvous device. It cooperates with the SIP core 116, allocating ports for a plurality of client devices 100. A network controller 152 with dual Athalon CPUs may handle as many as 4,000 sessions with client devices 100. Network controllers can also be implemented using clusters of computers, thereby increasing the number of client devices served. To the SIP server, it emulates a client device. The network controller 152 may be positioned in a DMZ between the net/firewall 145 and a network 146 or it may be in the general address of the network 146. The network controller 152 is coupled across the network to the SIP server 164 and is accessible to network controllers and media forwarders used by other devices.

The media forwarder 153 acts as a relay device. It allocates ports for both media and control information exchanged with device 100 and ports for media and control information exchanged with a remote device. The media forwarder may be coupled on the device 100 side to either the client messaging manager 121 or the VOIP engine 144, as will be illustrated in other figures. For voice over IP communications, the media control information may be conveyed by RTP/RTCP packets. For instant messaging, such as implemented by Jabber, session information may be conveyed by XMPP. There are a variety of options, such as UDP or TCP sessions, for communicating serial data such as file transfer and video streaming. The media forwarder may be coupled on the remote side to another media forwarder or network controller, which is in turn coupled to a peer device, or it may be coupled to a peer device through a network without an intermediate network controller or media forwarder. Ports on the media forwarder 153 may be initially allocated, in preparation to be used if hole punching fails, and de-allocated without being used, if hole punching succeeds.

FIG. 22 illustrates additional aspects of the intermediate driver operation. The features introduced in the figure with new numbers include the NIC 2260 and "outside" 2265, which may refer to a media forwarder, to a NIC of another device, or other point of communications. In this context, "NIC" is not meant to be limiting. It refers to some or all of the software and hardware with which a stack might communicate to place messages onto the physical layer. The figure depicts the intermediate layer 140 in communication with the stack 131 and processing both outgoing and incoming packets. Two special cases are note worthy. If a firewall blocks UDP packets, the UDP payload of a packet can be repacked by the CMM 121 into a TCP packet, to be reverted to UDP format after reaching the media forwarder. To accomplish the repacking, the intermediate layer 140 detects a UDP packet under circumstance that UDP is blocked. The intermediate layer redirects the packet that the stack 131 has destined for transmission via the NIC 2260 to the CMM component 121. The CMM component identifies the UDP payload and places it in a TCP packet. The TCP packet is then routed by the CMM through the stack 131. This time, when the packet reaches the intermediate driver 140, it is in TCP format, so the intermediate driver hands the packet over for transmission. This is illustrated in the figure. The second special case is when probing needs to be conducted, as described below, but the port to be probed may already be allocated, which would normally prevent it from being used for probing. For instance, when the system is moving from one access point to the next, it may be necessary to probe topology or to probe for hole punching. The intermediate driver design allows the application interface or other components to have the intermediate driver send probe packets and intercept responsive packets, without sending the packets through the stack, which had previously allocated the port that is being probed. This special case is not illustrated in FIG. 22, which depicts all packets as passing through the stack.

FIGS. 2-21 are variations on illustrating communications during operation. Some of the diagrams such as FIG. 2, which we sometimes call swimming lane diagrams, represent components and devices as vertical lines and communications as horizontal lines and illustrate individual messages. Other diagrams, such as FIG. 6, represent components and devices as blocks and illustrate a communication pattern. The communication pattern diagrams, FIGS. 6-12, are provided to illustrate more clearly variations in flow patterns that can be extracted from the swimming lane diagrams.

Figure 2:
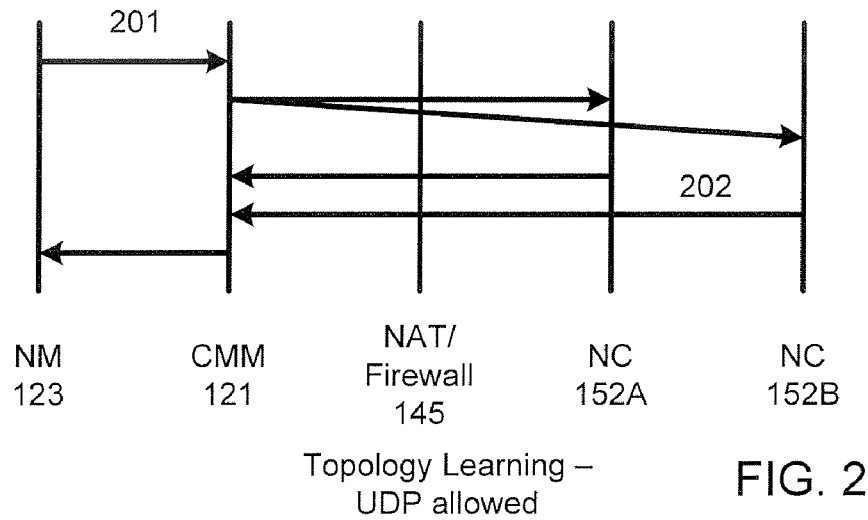
Figure 3:
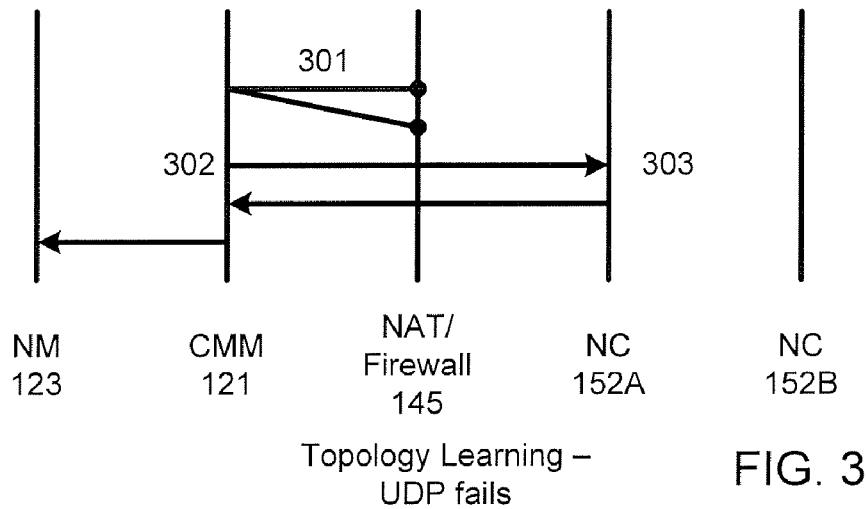

FIGS. 2 and 3 depict topology learning in cases where the firewall permits and denies initiation of unreliable transport sessions. In these figures, the components and devices illustrated are a network manager 123, a client messaging manager 121, one or more NAT and firewall devices 145 and a pair of IP/port addresses at which one or more network controllers 152A, 152B can be reached. (Where the numbering matches references in FIG. 1, the explanations are intended to complement each other.)

In FIG. 2, the first communication flow is referenced as 201. The communication flow 201 is initiated by the network manager 123. This may be in response to an initialization of the device 100 or because the IP address of the device is changed. It also may be performed periodically. It is useful for this communication flow to be initiated independently of initiations of call sessions, to reduce the time required to execute a session initiation protocol. The client messaging manager sends unreliable transport probing messages through the NAT/firewall 145 to a pair of IP/port addresses 152A, 152B. In this scenario, the firewall permits initiation of unreliable transport sessions and one or more network controllers return responses to the client messaging manager 202, which passes them on to the network manager 123. The messages 202 convey IP/port addresses that the network controller 152 can discern from the packets received. These IP/port addresses include at least the external IP/port addresses assigned by the NAT/firewall 145 to the packets in flow 201. After the message exchange flow 201, 202, the client messaging manager and network manager 121, 123 know both the internal and external IP/port addresses used for unreliable transport sessions. By analyzing the information received in the pair of messages 202 received from different IP/port addresses 152A, 152B, the manager components 121, 123 or another component cooperating with them can determine that the firewall permits unreliable transport (because the return did not timeout) and whether the NAT/firewall number 145 allocates external IP/port addresses in a way that is predictable to the device 100. This generally corresponds to whether the NAT is a so-called symmetrical or cone NAT. While the behavior of a symmetrical NAT is pre-programmed, any particular client device 100 does not have enough information to predict the external IP/port address that will be assigned when it initiates an unreliable transport session. In general, the symmetrical NAT is not considered punchable. When a symmetrical NAT is detected, the manager components expect that media will have to be relayed through a media forwarder. While FIG. 2 is described as involving unreliable transport sessions and packets, unreliable and reliable transport can be combined to test the respective characteristics of passing UDP packets and assigning ports.

In FIG. 3, communication flow 301 is initiated by the CMM 121, but is blocked by the firewall number 145. This topology learning may be initiated at startup, when the intermediate driver detects a change in IP address or when a connection is lost and needs to be reestablished. The flow 301 times out and the manager learns that unreliable transport sessions are blocked by the firewall. It does not matter how the NAT allocates ports for unreliable transport, if the firewall blocks unreliable transport sessions. The client messaging manager uses a reliable transport probe 302 to set up a UDP over TCP tunnel with a network controller 152. By UDP over TCP, we mean sending the UPD data payload via TCP packets. Alternatively, TCP tunneling of UDP packets could be used, with the UDP headers sent via TCP packets, in addition to the UDP payloads. The network controller confirms 303 establishment of the tunnel. Following the flows in FIG. 3, a reliable transport session between device 100 and the network controller 152 is established and available. If desired, the session may be encrypted using a secure socket layer (SSL) or other protocol.

Figure 4:
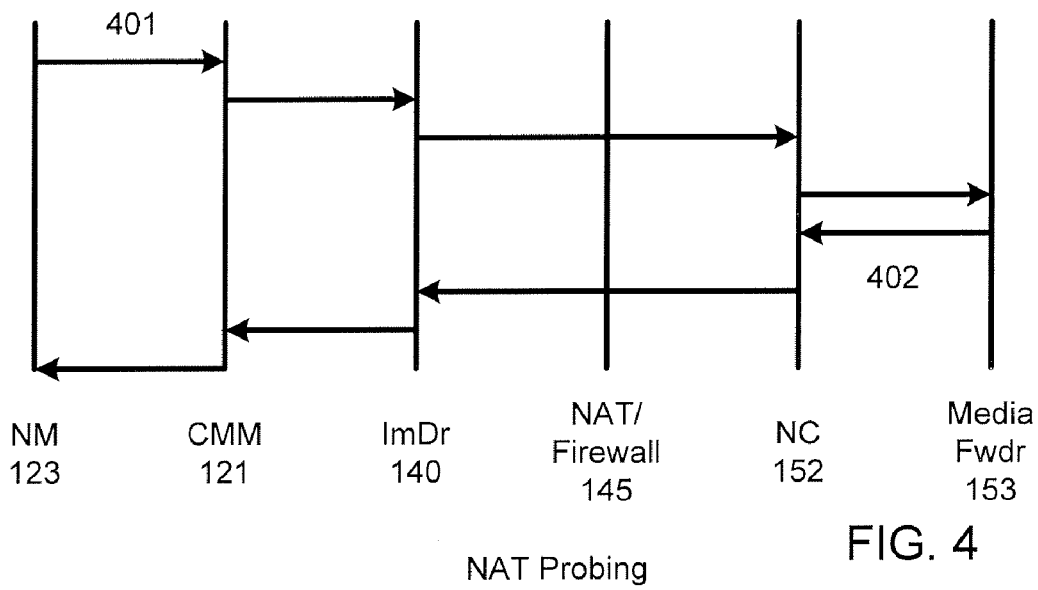

FIG. 4 illustrates probing that takes place when a user at the user interface 111 of FIG. 1 requests initiation of a session, for instance by pushing the talk button, in advance of a standard session initiation message exchange. At the outset of this probing, the call controller 114, through the API 122, informs the network manager 123 of the internal (inside the NAT) ports that it is using for RTP and RTCP traffic. This guards against an instance in which the device 100 has specially assigned RTP and RTCP ports that deviate from the customary use of ports 8000/8001. The probing message flow 401 causes allocation of media forwarder 153 relay device ports, which is followed 402 by return of the IP/port addresses allocated. Direct communications from the client manager 121 to the VOIP engine 144 makes the probing transparent to the stack 131 and the device 100 operating system. Responsive to the probe, four ports are allocated on the media forwarder 153, two facing the initiating peer device and two facing the responding peer device.

FIG. 5 illustrates the path generally used to prepare for SIP registration after topology learning. SIP registration is intended to inform a SIP server 164 of the port at which the device 100 can be reached by the SIP server and other peer devices. FIG. 6 illustrates the particular message flows that implement port allocation and SIP registration. In FIG. 6, we see a session initiation request coming from the user at the user interface 111. While FIG. 1 shows that the user interface 111 is coupled to the voice over IP component 112, that component has been omitted for sake of clarity in FIGS. 6-12. Also omitted is routing of communications through the application program interface 122, the driver interface 125, the virtual interface 141 and the stack 131. The call controller 114 processes the initiation through the network manager 123, which communicates through the client messaging manager 121 with the network controller 152. A TCP/IP tunnel is used to assure that SIP messages communicated through the network controller to the SIP server are reliably delivered (and acknowledged.) The network controller allocates an IP/port address through which the call controller and SIP server will communicate.

In FIG. 6, we see the particular message flows for SIP registration. Flow 601 progresses from the user interface to the network controller. In a special case, where topology learning has detected that no NAT is present and the network controller has not indicated some reason that communications with the SIP should be routed through the network controller, there is no need to involve the network controller in the SIP message flows and the device 100 can communicate directly with the SIP server 154 for registration and setup messaging. Assuming that a NAT is present, the SIP registration initially goes to the network controller 152 for allocation of a port to be used by the device 100. The IP/port address at the network controller 152 assigned to the device 100 through which the call controller 114 will communicate is returned in flow 602 to the network manager 123 and call controller 114, for use in SIP messages. The flow 603 uses the allocated IP/port address to route an SIP registration message through the network controller to the SIP server. Not shown is the acknowledgement by the SIP server of the registration.

FIG. 7 illustrates the TCP tunnel path set up for handling media when UDP traffic is blocked by the firewall. Following an initiation request at the user interface 111, the call controller 114 communicates with the network manager 123, which uses the client messaging manager 121 and network controller 152 to establish a TCP tunnel with the media forwarder 153 for media messages. In this scenario, UDP payloads pass through the firewall in TCP packets and the media forwarder recreates packets in the expected UDP format. The resulting tunnel path is illustrated by dotted lines. Details of the packing of UDP payloads into TCP packets appear in FIG. 22, described above. Transport by unreliable protocols is favored because voice and similar communications readily tolerate packet loss and may be easier for a user to understand if lost packets are dropped than if latency is introduced to reliably assure retransmission of lost packets. Using unreliable transport protocols, an application layer acknowledgement is used for control information.

FIG. 8 illustrates a path generally used for probing in response to an initiation request, prior to SIP messaging. The call controller 114 signals the network manager 123 that SIP messaging is about to begin. The network manager communicates through the intermediate driver 140 and client messaging manager 121 with the network controller 152.

FIG. 9 illustrates the path generally used for a private UDP punch. As discussed above, private UDP punching refers to using the internal IP/port addresses of both the initiating and responding peer devices for direct UDP communications. In this path, the call controller 114 communicates with the network manager 123 which relies on the intermediate driver 140 to set up a UDP session directly, if it can. If this succeeds, the intermediate driver 140 will spoof packets that pass through the stack 131, as will be explained later.

FIG. 10 illustrates the path generally used for the SIP messages invite, 180 ringing, 200 OK and ACK acknowledgement. The call controller relies on the SIP core 116 which sends SIP traffic to the intermediate driver 140. SIP message traffic is reliably communicated using the client message manager 121 to the network controller 152. The network controller is in communication with the SIP server 154.

While the figures illustrate SIP messaging with additional information added in optional parts of the SIP messages, the same approach can be applied to other session initiation message exchanges, such as XMPP used for instant messaging. Generally, any protocols, such as XMPP, HTTP or any protocol suitable for session initialization could be used to exchange peer device's network conditions with which the peer-to-peer hole punching and fall back to media relay technique could apply. Further, this invention not only applies to VOIP, a voice communication application, but also other type media streaming applications, such peer-to-peer based media streaming, file transfer, or content distribution. For some embodiments, this disclosure teaches an enhancement of session initiation messaging that preserves the usability of some network positioned components, such as the session initiation server, and minimizes the customization of on-device software components, such as the call controller 114 and the cores for handling message initiation 116 and media traffic 115 FIG. 11 illustrates the path generally used for the SIP message ACK. This message flows backward from the responding peer device to the initiating peer device. It may pass through the network controller 152 or the media forward 153, depending on the success of punching. If it passes through the media forwarder, then it goes directly to the intermediate driver 140. If it is routed through the network controller 152, it goes through the client message manager 121 to the intermediate driver 140. Because this is an SIP message, the intermediate driver 140 routes it to the SIP core 116 and on to the call controller 114.

FIG. 12 illustrates the path generally used when UDP traffic is blocked and media packets need to be tunneled via TCP. Media packets are routed by the call controller 114 through the SIP core 116 to the intermediate driver 140. The intermediate driver relies on the client message manager 121 to repackage the packets and tunnel UDP over TCP to the media forwarder 153.

FIG. 15 illustrates the alternative paths used for UDP sessions, depending on whether the session is established directly between the peer devices or through one or more media forwarders 153. The call controller routes the SIP message through the SIP core to the intermediate driver. The intermediate driver 140 understands whether the media forwarder or direct path are to be used and modifies the packet source and destination appropriately.

The paths illustrated in FIGS. 5 through 12 and 15 may be helpful in understanding the particular message flows illustrated in the swimming lane diagrams of FIGS. 13-14 and 16-21. Typically, the swimming lane diagrams combine multiple paths.

Handling of different use cases can be categorized in a table and correlated with the figures. The table is interesting because it identifies the factors that dominate selection of routing and traversal strategies.

used for TCP tunneling may or may not be the same media forwarder used for UDP relay.

| Technology equipped or not | Firewall allows UDP | NAT present | Symmetric or Cone NAT | Initiating figure(s) | Receiving figure |
|---|---|---|---|---|---|
| Equipped or not | No; blocked | No | N/A | UDP over TCP tunnel, FIGS. 12-13 | 14 |
| Equipped or not | No; blocked | Yes | Cone | | |
| Equipped or not | No; blocked | Yes | Sym | | |
| Equipped | Yes | No | N/A | 15-16 | 17 |
| Equipped | Yes | Yes | Cone | 18 | 19 |
| Equipped | Yes | Yes | Sym | 20 | 21 |
| Not | Yes | No | N/A | No cooperative punching; UDP relayed to other peer's media forwarder; see "Equipped/Sym" FIGS. 20-21. | |
| Not | Yes | Yes | Cone | | |
| Not | Yes | Yes | Sym | | |

FIG. 13 is a message flow diagram generally illustrating the initiation of the call when a UDP session initiation is blocked by the firewall, requiring a TCP tunnel or private UDP punching. Flow 1301 begins with a request by the user at the user interface 111 to initiate a call. The call controller 114 follows the TCP tunneling flow of FIG. 7. It signals the network manager 123, indicating that a TCP tunnel needs to be established. The network manager relies on the client messaging manager 121, which requests allocation of ports on the media forwarder. In message flow 1302, media forwarder 153 returns the allocated port numbers via the network controller 152. Confirmation that the tunneling request has been completed is passed to the call controller. Not illustrated is the SIP registration message flow. In message flow 1303, the call controller sends an SIP invite or similar message. Because it is part of an SIP message flow, it passes through the SIP core to the voice over IP engine. The voice-over-IP engine relies on the client messaging manager and network controller. The network controller is in contact with the SIP server. In message 1304, a ringing message is returned from the responding peer device through the network controller, client message manager, voice-over-IP engine and SIP core to the call controller. The ringing message or a similar privately defined message conveys internal and external IP/port addresses at which the responding peer device expects to be reached. This information may be conveyed as extra addresses added to a standard SIP message. The call controller, in message flow 1305, uses the API to contact the network manager, which initiates hole punching. The network manager relies on the voice-over-IP engine to initiate a UDP hole punch. Only private hole punching is initiated in this scenario, because UDP session initiation is blocked by the firewall. In message flow 1306, the result of the private UDP hole punch, determined by the responding peer device, is reported in an SIP OK message or, alternatively, in a privately defined message. Yet alternatively, the establishment of the UDP session with the responding peer device may be enough to establish the routing and traversal strategy to be used. Because the private hole punching is the alternative to TCP tunneling in this case, if it works, it is most likely to be selected. Once the routing and traversal strategy has been selected, the session proceeds as indicated in message flow 1308. Either the TCP tunnel 1311 or private UDP session 1312 is used. In this diagram, the TCP tunnel is routed through the client messaging manager to the media forwarder. The media forwarder FIG. 14 is a message flow diagram generally illustrating response to initiation of a session by the responding peer device that implements the technology disclosed. In this case, the responding peer device cannot receive or initiate UDP sessions, because they are blocked by a firewall. An SIP invite message arrives unsolicited in message flow 1401. (The SIP registration message is not illustrated.) At the peer device that is receiving the call, the call controller uses the API and the network manager 123, which initiates a TCP-based probe 1402 through the client messaging manager to the network controller, signaling the network controller to have the media forwarder set up a TCP tunnel. In response 1403, the network controller, the client message manager and the network manager receive the IP/port addresses allocated by the media forwarder for the TCP tunnel, on the side facing the device 100, and UDP communications, on the other side facing the peer device. The call controller 114 receives an acknowledgement. In message flow 1404, the call controller sends an SIP ringing message or privately defined message. An SIP ringing message is routed through the SIP core or a similar privately defined message is sent. The message flows through the voice-over-IP engine, client messaging manager and network controller to the SIP server, then on to the initiating peer device. Between the ringing message 1404 and the OK message 1406, the responding peer device may receive a private UDP punch probe from the initiating peer device, which does not appear in the diagram. If the private UDP punch is received, the responding peer device may acknowledge the packets and build a session. This session may be selected by the responding peer device as the route to be used, as the selected routing strategy, or its availability can be described to the initiating peer device, in alternative embodiments that have the initiating peer device select the routing strategy. Alternatively, but not illustrated, the responding peer device could initiate a UDP punch using the technologies described herein. In message flow 1405, the network manager 123 and voice-over-IP engine 144 exchange set up information including IP/port addresses. The status of private punching is reported by the network manager to the call controller 114. The network manager advises the voice-over-IP engine of the selected route and traversal strategy. In message flow 1406, the responding peer device sends an SIP OK message or similar privately defined message to the initiating peer device. As illustrated, the responding peer device has selected the routing and traversal strategy. This information is conveyed in message flow 1406 through the SIP core, voice-over-IP engine, client messaging manager and network controller. The initiating peer device responds message 1407 with an ACK acknowledgment. In an alternative embodiment, the initiating peer device determines the routing and traversal strategy and the ACK message 1407 reports this determination. The actual media session is represented in flow 1408. Depending on the outcome of private UDP punching, the message flow 1408 is directed either through a UDP over TCP tunnel 1411 or via UDP 1412 after a successful private UDP punch.

If the responding peer device uses the technologies described, but the initiating peer device does not, one or more messages from the initiating device will not convey the expected IP/port addresses. In that case, assuming UDP is blocked, no effort is made to private punch and no UDP private punch message will be received by the responding peer device. The set up in message flow 1405 does not report success or failure of a private UDP punch to the call controller 114, because there is no effort to make a private punch. The option of conducting the session over private UDP 1412 is eliminated, because cooperative private punching is not an option.

FIG. 16 is a message flow diagram generally illustrating initiation of a call in a simple case where there is no NAT to traverse and UDP is allowed by the firewall, following registration during which the network controller authorized the initiating device to communicate directly with the SIP server. This authorization is useful, if optional, to accommodate cases in which, even though no NAT is present, the SIP server (or a packet filtering device protecting the SIP server) accepts session initiate messages only from the network controller. Flow 1601 begins with a request by the user at the user interface 111 to initiate a call. The call controller 114 follows the RTP transport via a UDP flow pattern similar to FIG. 15, modified for the intermediate driver 140 to communicate with the SIP server 154 (not in the figure). In flow 1601, the call controller 114 signals the network manager 123, which communicates with the client messaging manager. The client messaging manager is not required to set up tunnels or allocate media forwarder ports, because preliminary topology probing disclosed that the device was not behind an NAT. In message flow 1602, the client messaging manager acknowledges the initial message from the call controller 114. In message flow 1603, SIP messaging begins. In an alternative embodiment, private messages may be used. Message flow 1603 corresponds to an SIP invite message sent between intermediate driver 140 for the initiating peer device and an SIP server. The intermediate driver 140 simply passes the message through to the network adapter or other device for sending the message via the network. In message flow 1604, a ringing message returns from the responding peer device and is forwarded to the call controller 114. The session may be configured so that the voice-over-IP engine 114 communicates with a corresponding voice-over-IP engine of the responding peer device or with the media forwarder of the responding peer device. In message flow 1605, the call controller uses the API and the network manager relies on the voice-over-IP engine to set up a natural UDP connection, as this use case involves no NET traversal. Consistent with the prior description, the responding peer device, in an SIP OK message 1606, may select the routing and traversal strategy to be used or may provide information with which the initiating peer device can select the routing and traversal strategy. Message flow 1607 may correspond to an SIP ACK message sent to the responding peer device. The in-session message flow 1608 proceeds through the SIP core and voice-over-IP engine with a natural UDP connection. Again, the natural UDP connection may be directly with a responding peer device with a media forwarder designated by the responding peer device.

FIG. 17 is a message flow diagram generally illustrating response to initiation of the session in the simple case where the responding peer device has no NAT to traverse and UDP is allowed by the firewall, after registration and, optionally, authorization to communicate directly with a SIP server. An SIP invite message arrives unsolicited in message flow 1701 at the responding peer device. The responding peer device's call controller uses the API and the network manager 123 initiates a probe 1702 through the client messaging manager to the network controller. The network controller responds 1703 with at least the external IP/port address, which will match the internal IP/port address in this case, indicating or confirming that no NAT is present. The responding peer device sends an SIP ringing message 1704 through the SIP core to the intermediate driver and onward.

Between the ringing message 1704 and the OK message 1706, the responding peer device may receive a private UDP punch probe from the initiating peer device, which is not illustrated in this figure. Alternatively, and also not illustrated, the responding peer device could initiate a UDP punch using the technologies described herein. In message flow 1705, the network manager 123 and intermediate driver 140 exchange setup information including IP/port addresses. The status of private punching is reported by the network manager to the call controller 114, assuming both the initiating and responding peer devices are equipped with the technology. If the responding peer device detects that the initiating peer device is not equipped, then the reporting from the network manager to the call controller is omitted. The network manager advises the intermediate driver of the selected route and traversal strategy. In message flow 1706, the responding peer device sends an SIP OK message or a similar privately defined message to the initiating peer device. As illustrated, the responding peer device has selected the routing and traversal strategy. This information is conveyed in the message flow 1706 through the SIP core, intermediate driver, client messaging manager and network controller. The initiating peer device responds in message flow 1707 with an ACK or acknowledgment. In an alternative embodiment, the initiating peer device determines the routing and traversal strategy and reports this determination in the ACK acknowledgment. The actual media session is represented in flow 1708. In this scenario, the connection between intermediate driver 140 and the initiating peer device is a natural UDP connection. Depending on characteristics of the initiating peer device, the natural UDP connection may be with an intermediate driver of the initiating peer device or a media forwarder associated with it.

FIG. 18 is a message flow diagram generally illustrating initiation of a call in a case where the NAT device implements a cone NAT and the firewall permits initiation of UDP sessions. Flow 1801 begins with a request by the user at the user interface 111 to initiate a call. Media transport follows the RTP transport via a UDP pattern in FIG. 15. In flow 1801, the call controller signals the network manager, which communicates with the client messaging manager. The client messaging manager utilizes the network controller to allocate ports on the media forwarder on a standby basis, expecting that UDP punching will succeed. In message flow 1802, the media forwarder and network controller identify allocated ports to the client messaging manager. The client messaging manager acknowledges the initial message from the call controller. The network manager reports the collected information to the intermediate driver. In message flow 1803, SIP messaging begins. In an alternative embodiment, private messages may be used. Message flow 1803 corresponds to an SIP invite message sent between the network controller 152 for the initiating peer device and an SIP server. In message flow 1804, the intermediate driver pre-builds a tunnel to the media forwarder for RTP relay, in case the responding peer device does not support cooperative hole punching. In message flow 1805, a ringing message returns from the responding peer device and is forwarded to the call controller 114. The session may be configured so that the intermediate driver 140 communicates with the corresponding intermediate driver of the responding peer device or with the media forwarder of the responding peer device. In message flow 1806, the call controller uses the API, and the network manager relies on the intermediate driver to initiate hole punching. Both internal and external IP/port addresses are used for punching, implementing both public and private UDP punching. The responding peer device, in an SIP OK message 1807, may select the routing and traversal strategy to be used or may provide information which the initiating peer device can use to select the routing and traversal strategy. Message flow 1808 may correspond to an SIP ACK message by the initiating peer device to the responding peer device. The in-session message flow 1809 proceeds through the SIP core and intermediate driver. Throughout depends on the success of UDP punching. Public punching 1811 may succeed if both peers are behind cone NATs, in which case the intermediate driver 140 addresses packets to the external IP/port address of the responding peer device. Private punching 1812 may be used if both peers are in the same address space, resulting in the intermediate driver 140 addressing packets to the internal IP/port address of the responding peer device. UDP relay 1813 may be used if cooperative hole punching is not available.

FIG. 19 is a message flow diagram generally illustrating response to initiation of a session when the responding peer device is behind a cone NAT and a firewall that allows UDP sessions. An SIP invite message arrives unsolicited in message flow 1901 at the responding peer device. The responding peer device's call controller uses the API and the network manager 123 initiates a probe 1902 through the intermediate driver to the network controller. In this special case, the intermediate driver sends a UDP message to the network interface without routing it through the stack. This allows the intermediate driver, which filters incoming packets, to share a port number that may already be in use, for instance, when the device is moving from one access point to another. The network controller responds 1903 with at least the external IP/port address of the responding peer device. The responding peer device sends an SIP ringing message 1904 through the SIP core to the intermediate driver, client messaging manager and network controller to the SIP server, then on to the initiating peer device. Between the ringing message 1904 and the OK message 1906, the responding peer device may receive a private UDP punch probe from the initiating peer device. Alternatively, but not illustrated, the responding peer device could initiate a UDP punch using the technologies described herein. In message flow 1905, the network manager 123 and intermediate driver 140 optionally exchange setup information including IP/port addresses. (This may be accomplished at another stage.) The intermediate driver initiates standby allocation of ports on the media forwarder. The status of private punching and the allocation of media forwarder ports are reported to the network manager. The network manager advises the intermediate driver of the selected route and traversal strategy. In message flow 1906, the responding peer device sends an SIP OK message or similar privately defined message to the initiating peer device. As illustrated, the responding peer device has selected the routing and traversal strategy. This information is conveyed in message flow 1906 through the SIP core, intermediate driver, client messaging manager and network controller. The initiating peer device responds in message flow 1907 with an ACK acknowledgment. In an alternative embodiment, the initiating peer device determines the routing and traversal strategy and the ACK message reports this determination. The actual media session is represented in flow 1908. Depending on the outcome of public and private UDP punching and the capabilities of the initiating peer device, the media session may be directed 1911 to the external IP/port address of the initiating peer device, directed 1912 to the internal IP/port address of the initiating peer device or directed 1913 via the media forwarder.

FIG. 20 is a message flow diagram generally illustrating initiating a call in the case where the NAT device implements a symmetric NAT and the firewall permits initiation of UDP sessions. Media transport follows the media forwarder branch of the RTP transport via a UDP pattern in FIG. 15. Message flow 2001 begins with a request by the user at the user interface 111 to initiate a call. In message flow 2002, the call controller signals the network manager, which communicates with a client messaging manager and network controller. The network controller allocates ports to be used in communication with an SIP server. In message flow 2003, the network controller identifies allocated ports to the client messaging manager. The client messaging manager acknowledges the initial message to the call controller. The network manager reports the collected information to the intermediate driver, which is not otherwise in this message flow. In message flow 2003, SIP messaging begins. In an alternative embodiment, private messages may be used. Message flow 2003 corresponds to an SIP invite message sent between the call controller 114 for the initiating peer device and an SIP server. In message flow 2004, the intermediate driver prebuilds a tunnel to the media forwarder for RTP relay, in case private punching with the peer device does not succeed. In message flow 2005, a ringing message is returned from the responding peer device and forwarded to the call controller 114. The session may be configured so that the intermediate driver 140 communicates with the corresponding intermediate driver of the responding peer device or with the media forwarder of the responding peer device. In message flow 2006, the call controller invokes the API and the network manager informs the intermediate driver of the available ports. The intermediate driver 140 undertakes private punching, but may bypass public punching because previously conducted topology discovery ruled out public punching. In message flow 2007, the initiating peer device receives an SIP OK message from the responding peer device. As described above, this message may include direction as to the routing and traversal strategy to be used or may provide information for the initiating peer device to use in determining routing and traversal strategy. The message flow 2008 may correspond to an SIP ACK message by the initiating peer device to the responding peer device. The in-session media flow 2009 follows a path that depends on the success of private UDP punching. After a successful private UDP punch, traffic is routed 2012 without relay. Otherwise, traffic is routed 2011 through a media forwarder to the initiating peer device.

FIG. 21 is a message flow diagram generally illustrating response to initiation of a session when the responding peer device is behind a symmetric NAT and firewall that allows UDP sessions. An SIP message arrives unsolicited 2101 at the responding peer device. The responding peer device's call controller uses the API and the network manager 123 initiates a probe 2102 through the client messaging manager to the network controller. The network controller 152 causes the media forwarder 153 to allocate ports. The media forwarder and network controller respond 2103 by reporting the allocated ports to the network manager, which acknowledges the initial message to the call controller. In message flow 2104, the responding peer device sends an SIP ringing message through the SIP core to the intermediate driver, client message manager and network controller to the SIP server, then on to the initiating peer device. Between the ringing message 2104 and the OK message 2106, the responding peer device may receive a private UDP punch from the initiating peer device. Alternatively, but not illustrated, the responding peer device could initiate a UDP punch using the technologies as described herein. In message flow 2105, the network manager 123 and intermediate driver 140 exchange setup information. Media forwarder 153 ports are or previously have been allocated, because punching is considered unlikely to succeed. At least completion of these actions is reported to the call controller 114. In message flow 2106, the responding peer device sends an SIP OK message or similar privately defined message to the initiating peer device. As illustrated, the responding peer device has selected the routing and traversal strategy. This information is conveyed in message flow 2106 through the SIP core, intermediate driver, client messaging manager and network controller. The initiating peer device responds in message flow 2107 with an ACK or acknowledgment. In an alternative embodiment, the initiating peer device determines the routing and traversal strategy and the ACK message reports this determination. The actual media session is represented in flow 2108. Depending on the outcome of private UDP punching and the capabilities of the initiating peer device, the media session may be directed 2111 via a media forwarder 153 or directly 2112 to the initiating peer device.

If the initiating peer device does not support the technology disclosed, UDP relay 2112 will be the only available path.

Mobility Features

FIGS. 23-31 illustrate features that may be combined in a system that supports mobility of the device among access points, including changing the IP address of the device as it moves, without terminating a media session. FIG. 23 illustrates the movement. This figure depicts two levels of routers 2300, 2311, 2315 which may include DHCP, firewall and/or NAT functionality. The first pair of access points 2322, 2323 are illustrated as being within the same addressing space. As device 100A migrates from a connection with access point 2322 to a connection with access point 2323, it is able to keep the same IP address as it changes access point. The third access point 2326 is illustrated as being in a different addressing space managed by router 2315. When the device 100A moves to connect with access point 2326, it is assigned a new IP address within the address space of router 2315. This move also may change the firewall and NAT characteristics with which the device needs to contend.

FIG. 24 is a high-level mobility algorithm flowchart. Some of the boxes in this high-level flowchart are further detailed in the subsequent figures. Initialization 2401 begins with parameter input from a configuration file, registry entry or other source. In some embodiments, the parameter input source may be a binary object bound to the application. The parameters indicated include: T1, a time interval for performing a selected channel scan; T2, a time interval for getting statistics from hardware, such as received signal strength indicators; T3, a time interval for performing a full scan of channels; T4, a time interval for heartbeat monitoring; T5, a maximum round-trip delay allowed for ping messages sent through the current access point; and S1, the signal strength threshold. In addition, a prebuilt network channel table may be loaded, if available. A prebuilt network channel table may be compiled by discovery or specified by an administrator. One use of a prebuilt network channel table is to identify channels that should be scanned as a device moves away from an access point or toward another access point. There are typically more wireless channels and sub channels theoretically available for use then are effectively used at any point in space. The time and power consumed scanning for available channels 2425 may be reduced using a prebuilt network channel table.

From the binding procedure 2403, processes are started for 802.11 monitoring 2411, heartbeat monitoring 2415 and channel list tracking 2405. One embodiment of an 802.11 monitoring process is further described in FIG. 25. Heartbeat monitoring is further described in FIG. 26. Channel list tracking is further described in FIG. 28. Either the 802.11 monitoring process 2411 or the heartbeat monitoring 2415 can initiate the scan channel process 2413. One criteria that the 802.11 monitoring process can use is, start scanning channels if the signal strength drops below a threshold S1, which is one of the input parameters. A criteria that the heartbeat monitoring process 2415 can use is, start scanning channels if the delay between heartbeats is greater than threshold T5, which is another of the input parameters. When scanning of channels is initiated, the mode of channel scanning may be adapted to whether the current access point supports power saving mode 2423. Power saving mode is a feature which allows a mobile device to declare that it has entered power saving mode. The access point responds by buffering packets while it brings the mobile device out of power saving mode. This buffering capability is limited. The access point may find it necessary to report itself as busy to upstream components, if its buffer is full or approaching full. One use of power saving mode is for the mobile device to cause the access point to buffer packets while the mobile device tunes its radio to other channels for scanning. If the current access point supports power saving mode, a selected channel scan 2425 may be conducted. Otherwise, a full channel scan 2421 may be conducted. The selected channel scan may take advantage of a channel tracking list 2405 to determine which channels initially to scan. It is useful to complete a phase of channel scanning in 50 milliseconds or less. Studies of human speech comprehension indicate that a 50 millisecond gap in sound is tolerable to most subjects. Applying this parameter, the selected channels may only be able to send out probes during a particular 50 millisecond time slice and may need to wait to receive acknowledgments until another time slice has begun.

With reference to FIG. 1, a strategy for time-sharing a single radio can be described. The intermediate driver 140 includes three virtual interfaces 141, 142, 143. The voice over IP engine 144 coordinates the actions of these virtual interfaces. The first virtual interface 141 presents a static IP address appearance to the stack 131. It presents this appearance, even as the IP address designated for the device by a DHCP server changes. The pair of virtual interfaces 142, 143 timeshare the network hardware, including the radio. Only one of the virtual interfaces can command the radio and other hardware at a time. The voice over IP engine 144 allocates time slices between the virtual interfaces. When a virtual interface has control over the radio, it tunes the radio to the desired channel, if it is not already at that channel. It uses the radio during its time slice. A stationary device 100 has relatively little need to timeshare the radio. A quickly moving device 100 may transit rapidly from one access point to the next and make substantial use of time-sharing. Use of the power saving mode feature, described above, can enable buffering by the access points that minimizes loss of packets during time shared slices. For packets that are carried by reliable transport, the transport layer can be relied upon to retransmit lost packets. For packets that are carried by unreliable transport, the application layer will keep track of critical packets and resend them if no application layer acknowledgment is received.

Returning to FIG. 24, the selected channel scanning 2425 returns one, two or more access points as candidates to be the next access point used by the mobile device. If only one access point is identified during the selected channel scanning, additional channels may be scanned during the next time slice. Or, if the single channel found is a good candidate or the channel tracking list 2405 indicates that there is only one candidate access point in the area, the single access point may be selected without further channel scanning. The figure depicts identification of two candidate access points. In an area where a provider is attempting to assure coverage for mobile users, it is reasonable to assume that there will often be two candidate access points. This is a reasonable assumption because signal strength decreases approximately with the square of the distance from the transmitter. Overlapping transmission circles are essential to full coverage. Of course, three or four candidate access points could be considered, instead of just two, without substantially changing the process. When the candidate access points have been identified, the heartbeat check process 2433 contacts the network controller via the exiting access point with identifiers for the candidate access points. Heartbeat messages can be used to convey the identities of the candidate access points. The network controller responds with data indicating whether it believes the access points have reached their call limit. If all calls through the access points were processed by the same system and network controllers, the network controllers would have an accurate count of the number of calls being handled by the access points. This can be done without any modification to the access point hardware or software. Alternatively, the access points can be adapted to monitor their own loading and to report, in response to channel scanning, their current load. Either flags or load statistics can be used to evaluate the candidate access points 2443. Following the select channel scan loop 2443-2425, if flags or other statistics indicate that both candidate access points have already reached their call limit, additional channels are scanned by the selected channel scan process 2425. Otherwise, one of the candidate access points is selected 2453.

The alternative to selected channel scanning 2425 is full scanning 2421. In this context, full scanning looks at more channels than selected channel scanning. While full scanning is indicated as the path followed when power saving mode control is not available at the current access point, it might be conducted periodically or under predetermined conditions even when the power saving mode is available. A modified full scan 2421 might be used with the channel tracking list 2405, scanning all potentially available channels without relying on power saving mode. This might be done, for instance, when the call state was on hook, meaning that no call was in progress or in the process of being initiated. Like a selected channel scan, the full scan 2421 returns one, two or more access points as candidates to be the next access point used. Processing a full scan through the heartbeat check process 2433 and the access point selector 2443 resembles the processing described for selected channel scans, directly above. Following the full scan loop 2443-2421, if flags or other statistics indicate that both candidate access points have already reached their call limit, the full scan is repeated. Of course, repeating the full scan is more productive if the mobile device is in motion.

After one of the candidate access points has been selected 2463, the current call state is checked, to determine whether the phone is on hook or off hook. If the device is off hook, meaning a call is in progress, a handoff process 2465 is invoked. If either of the peer devices that are communicating is not equipped to cooperate in a handoff, access point switching proceeds at layer 2. If both are equipped to cooperate, the client messaging manager can be notified 2475 to carry out layer 3 switching. When switching is complete 2483, the process continues with heartbeat and 802.11 monitoring 2415, 2411. If the device is on hook, meaning no call is in progress, the newly selected access point is associated with the device 2461. The client messaging manager is notified to switch the access point being used 2471. Effectively, one virtual interface closes down its session with the prior access point and the other virtual interface conducts a session with the new access point. When switching is complete 2041, the process continues with heartbeat and 802.11 monitoring 2415, 2411.

FIG. 25 provides additional details regarding 802.11 monitoring, which was introduced in FIG. 24 at 2411. As illustrated, the process starts 2513 and sets up two types of monitoring. Applying the parameter S1, a signal strength monitoring process communicates with the intermediate driver 140 to set a signal strength threshold 2511. Asynchronously, it may receive from the intermediate driver a trigger corresponding to the threshold 2521. The second monitoring process 2515 is more sophisticated. It periodically queries the intermediate driver 144 for signal strength and network traffic statistics. The signal strength is used 2525 to determine a moving average signal strength. This allows the process to predict the need for a handoff before the received signal strength indicator drops below the signal threshold. The network traffic statistics are used 2535 to detect conditions such as noise that interferes with network traffic, even when the signal strength is good. Statistics, such as failed transmissions, retries, failures to obtain ready to send clearance, failures to obtain acknowledgments and error correction code faults, can be used to sense the health of the network channel and trigger scanning for a better channel. A request to initiate a scan 2533 can be triggered by any of the processes to detect signal strength below threshold 2521, decreasing signal strength 2525, or network traffic health statistics 2535, even though the signal strength is good. The 802.11 monitoring combines signal strength threshold monitoring with one or both of change in signal strength monitoring and network traffic health monitoring. The change in signal strength monitoring allows prediction of a need to change channels. The network traffic health monitoring allows both prediction of a need to change channels and a counterbalance to noise which impairs a network channel that otherwise has a strong signal.

FIG. 26 provides additional details regarding heartbeat monitoring, which was introduced in FIG. 24 at 2415. As illustrated, the process starts 2601 and applies a timer 2603 to measure round-trip delay of ping, heartbeat or other messages sent through the access point currently in use. The timer process 2603 signals the client messaging manager 121 to send and receive the message. Because individual messages can be delayed, an averaging filter 2605 is applied to the measured delay statistics. If the average delay exceeds a predetermined level or individual delays or packet losses exceed a predetermined or dynamically determined level, the heartbeat monitoring process 2415 may request a scan 2607. The heartbeat monitoring uses round-trip delay statistics to measure the quality of service at a current access point and request a scan for a new access point if the delay is excessive. The threshold for delay being considered excessive may be adapted to an environment recently measured by the device, for instance, measured in the last one, three, five or 10 minutes. The rate at which the device is moving may impact the acceptable delay.

FIG. 27 provides additional details regarding selected channel scanning, which was introduced in FIG. 24 at 2425. A network channel table is loaded 2701. The channel list is received 2703 from the channel list tracking process 2405 for the area where the device is located, if a local channel list is available, either compiled statically by a system administrator or dynamically by the device. A process iterates 2705 through the network or local channel list looking for strong signals. An average or moving average may be used to determine the signal strength on particular channels. The scanning of channels may be adapted to whether the current access point supports power saving mode, as described above. The intermediate driver 140, which conducts the channel scans, may be asked to invoke and apply the power saving mode feature. A timer for monitoring particular channels may be controlled by the mobility manager software component 124. The process for check selected channel scanning uses a channel list, such as a local channel list or network channel list, to iterate through channels considered potentially available and locate one, two, three or more candidate access points. The selected channel scanning process may take advantage of the power saving mode feature described above.

FIG. 28 provides additional details regarding channel list tracking, which was introduced in FIG. 24 at 2405. The channel list tracking process is started 2801. At an interval, which may be a predetermined interval or may be adapted to recent movement of the device, a scan initiation process begins 2803. The client messaging manager 121 is queried for the call state, to determine whether the device is on hook or off hook 2807. If the device is off hook, a call is in process or being initiated. The process may avoid periodic updating of the channel tracking list, if it would degrade a call in progress. If the device is on hook, the intermediate driver 140 is requested to provide a full scan 2809. The results are used to update the channel list 2811. The channel list tracking process uses the device's radio to scan for available channels and access points, in anticipation of the device moving. A channel list is dynamically renewed, without degrading a call that is in progress.

FIGS. 29 and 30 depict access point switching from the perspectives of the mobility manager 124 and the voice over IP engine 144, which were introduced in FIG. 1. The mobility manager receives identifications of one, two, three or more access points 2911. As illustrated, two candidate access point identifications are processed. The mobility manager notifies 2921 the intermediate driver to switch to a first candidate access point. The intermediate driver responds 2931 with information regarding the attempted switch, including a new IP address assigned by the candidate access point, if a new address has been assigned. (Recall from FIG. 23, the device may move from access point to access point 2322-to-2323 without a change in IP address.) If the intermediate driver succeeds in connecting with the first candidate access point 2941, the process tests whether a new IP address was assigned 2953. If the intermediate driver does not succeed in connecting, the mobility manager asks the intermediate driver 2951 to switch to a second candidate access point. The intermediate driver responds 2961 with information regarding the attempted switch, including any new IP address assigned by the candidate access point. If the intermediate driver succeeds in connecting to the second candidate access point 2971, the process tests whether a new IP address was assigned 2953. If the intermediate driver does not succeed in connecting 2981 and only two access point identifications are available, an error condition results. This may lead to selection of additional access point identifications, a retry of the same access point identifications, or, potentially, to a lost connection. Using either the first or second candidate access point, if a new IP address was received 2983, the voice over IP engine is invoked to conduct switching 3001, which is detailed in FIG. 30. If no new IP address was received 2985, layer 2 switching is performed immediately. Monitoring resumes. The mobility manager uses a short list of candidate access points to invoke the intermediate driver, which attempts to connect to one or more of the candidate access points. A successful connection is tested to determine whether a new IP address is being assigned to the device. If so, layer 3 switching is used to switch connections between access points. If no new IP address is assigned, layer 2 switching can be used.

FIG. 30 depicts access switching from the perspective of the voice over IP engine 144, which carries out layer 3 switching. The voice over IP engine switching process is invoked 3001. The intermediate driver includes and the voice over IP engine coordinates data transfer among three virtual interfaces, described above. Again, one virtual interface provides a static IP appearance to the device. A second virtual interface is exposed to the operating system for applications to use in communications. The third virtual interface is used by the intermediate driver and voice over IP engine for access point switching. It is not available to other applications. The voice over IP engine receives a switching request 3013 from the mobility manager 124. It determines whether the current access point supports power saving mode 3023. The process without power saving mode 3021 accepts packet loss. It expects the upstream components to retransmit essential packets that are unreliably transported, for lack of an application layer acknowledgment. Nonessential packets will be lost. A window for packet loss may be applied that guards against degradation in perceived media quality. For voice communications, a 50 ms window for packet loss is considered acceptable and a 30 ms window for packet loss is better. The process with power saving mode 3025 uses the buffering capacity of the access point or other upstream components to minimize packet loss. The process tells the access point that is entering into power saving mode, when it actually is retuning the radio to a different channel. The access point power saving mode feature leads the access point to buffer packets and attempts to bring the device out of power saving mode, so that it can forward packets. A window for power saving mode may be applied to guard against degradation in perceived media quality. For voice communications, the power saving mode may be in effect for 50 ms, 30 ms or less.

Whether using power saving mode or not, the voice over IP engine attempts a connection with the candidate access point. Failure to connect is not illustrated. If it connects, the voice over IP engine tests whether a new IP address has been assigned 3033. If no IP address has been received 3031, control returns to the mobility manager 124 for layer 2 switching. If a new IP address has been received 3035, layer 3 switching is carried out. The layer 3 switching may involve public and/or private hole punching, with or without relay, depending on network topology of the new access point, as described above. As illustrated, the routing strategy used may depend on the call status 3045. Under some circumstances, it may be preferred to use media relay at the new access point 3055, because fewer steps are required to establish a relay than for hole punching. If circumstances permit hole punching and selection of a preferred routing strategy through the new access point, a switching lock is tested 3043. A switching lock may be applied if a session initiation is in progress as the transition between access points is being attempted. If a switching lock is in effect 3051, control returns to the mobility manager 124 without accomplishing the layer 3 switching. If no switching lock is in effect, probes and punches 3053 can be conducted as described above. Using one routing strategy or another, the new access point will become the current access point 3063. Whether the session is punched or relayed, control returns to the mobility manager with information about the updated IP/port addresses.

FIG. 31 depicts application of a switching lock when session initiation is in progress, which guards against simultaneous change of access points by both peer devices. The figure depicts a calling party device 100A and a called party device 100B. The devices include components depicted in FIG. 1, such as a client messaging manager 121, mobility manager 124 and an intermediate driver 140. As described above, initiation of a call includes the calling party requesting UDP punching. The called party tests its store of state information 3116 to determine whether it already has initiated a UDP punch request. If not, the called party intermediate driver 140B sends a token to the mobility manager 124B setting a lock. If the called party already has initiated a UDP punch request 3216, it determines whether it is the caller. If not, the called party in the intermediate driver 140B sends a token to the mobility manager 124B setting a lock. The lock is released in due course (not illustrated.) If the called party is the caller, it proceeds to exchange a punch response 3215 and a punch acknowledgment 3315 with the calling party. Both parties may switch to a new channel 3314, 3316. The calling party and passes a switching acknowledgment 3412 from its intermediate driver 140A to its mobility manager 124A, which may as the client messaging manager 121 to set up a TCP tunnel 3411 at a specified IP address. The called party intermediate driver 140B passes appear switched message 3417 to its mobility manager 124B, including IP/port address information. This provides a simple mechanism for protecting against loosing a connection because both peer devices are switching access points at the same time.

Some Particular Embodiments

The technology disclosed can be practiced as a method, one or more devices adapted to practice aspects of the method, a system including a plurality of devices adapted to practice aspects of the method, or as a program that implements aspects of the method, whether the program is impressed on a computer readable media, stored in memory, or transmitted by a data stream. The many aspects of this invention can be combined and recombined in a variety of sub combinations, resulting in a variety of methods, devices, systems and programs.

In the context of this application, it should be understood that a relay device or media relay device refers to an active device with ports for ingress and egress. Separate sessions are established between the relay device and the originating device, on one set of ports, and the responding device, on the other set of ports. A message addressed to the media forwarder is received, transparently readdressed and forwarded. In the context of this application, a relay device does not include a simple network repeater that forwards packets without being the source or destination of a transport session. It does not include an NAT, which is addressed as a gateway. It does not include a simple router or proxy that exposes only an external address, guarding its internal addresses.

One embodiment discloses a method of resolving NAT and firewall related issues for initiation of a session using the session initiation protocol (SIP). This method includes preliminarily determining NAT/firewall topology, before a user request for initiation of a session between an initiating peer device and responding peer device. The preliminary determination includes sending two or more messages from the initiating peer device by an unreliable transport protocol through one or more NAT and firewall devices to two or more external IP/port addresses. It further involves listening for responses and determining from the responses or lack of response whether the firewall will allow initiation of unreliable transport protocol sessions and determining whether the NAT assigns IP/port addresses to the messages that are predictable by the initiating peer device. Subsequently, upon receiving the user request for initiation and before transmitting SIP messages to initiate the session, sending one or more probe messages through the one or more NAT and firewall devices to an external server, listening for responses and identifying from the responses one or more external IP/port addresses assigned by the NAT to the one or more probe messages. This method further involves proceeding with an exchange of SIP invite and other messages, wherein the SIP invite message from the initiating peer device includes, in addition to standard SIP information, at least an internal IP/port address (meaning inside the NAT) and the external IP/port address for the initiating peer device. It further involves avoiding punching and routing strategies that are ruled out using results of the preliminary topology determination and based on availability or unavailability of internal and external IP/port addresses from the responding peer device, which will indicate whether the responding peer devices capable of cooperative hole punching. Those factors taken into account, the method includes attempting cooperative and private hole punching to establish an unreliable transport session between the initiating and responding peer devices without forwarding through more external media forwarding devices the necessary. Cooperative hole punching, in this context, means one peer device causing its corresponding NAT to open a port and then listening for packets from the other peer device address to the open ports. Private hole punching means exchanging packets using the internal IP/port addresses of the initiating responding peer devices without address modification by one or more NAT devices. Encased cooperative hole punching is ruled out because the responding peer device is not equipped to or does not participate in cooperative hole punching and the private hole punching fails, the method falls back to establishing an unreliable transport session through one or more media forwarding devices.

One aspect of this embodiment may be compliance of the first session initiation message with an Internet standards track protocol known as the session initiation protocol (SIP). This aspect may include the first session initiation message conforming to the SIP "invite" message standard. The method may include either listening for or sending a message that identifies a selected traversal strategy to be used between initiating and responding peer devices. If it includes listening for an SIP-compliant message, the message would be an "OK" message. If it includes sending an SIP-compliant message, the message would be an "ACK" message.

Another embodiment discloses a method for an originating peer device to select among alternative routing and NAT traversal strategies for IP-based traffic that is tolerant of unreliable transport. Characteristics of one or more NAT and/or firewall devices coupled between the originating device and an IP-based network are determined as a preliminary matter. The preliminary determination may involve sending from the originating device a plurality of unreliably transported packets to a plurality of IP/port addresses on the opposite side of the NAT and firewall devices. The plurality of IP/port addresses may be at one or more physical devices. The preliminary determination may further involve listening for a reply to the plurality of unreliably transported packets and analyzing a pattern of the replies to determine whether the firewall device allows unreliable transport sessions and whether the NAT device is well behaved, meaning that an external port number will be assigned by the NAT device to outgoing packets that can be consistently predicted by the originating device. At least summary results of the analysis are retained.

The method may resume operation responsive to instructions by a user of the originating device to initiate IP-based traffic with the peer node, finding a feasible and preferred transport protocol and a relay or not-relay strategy. Using the summary results of the analysis, the originating device may send one or more packets to an external rendezvous device or network controller via a reliable transport protocol, the packets identifying the peer node with which the IP-based traffic is being initiated and an internal IP/port address being used by the originating device. The originating device then listens for a response to the packets. The response should provide at least a pair of two tuples, which two tuples identified the internal and external IP/port addresses of the peer node. Using a pair of two-tuples, the originating device sends a plurality of packets to the external and/or internal IP/port addresses of the peer node and listens for responsive packets from the peer node. The originating device participates in a session with the peer node using a traversal strategy adapted to whether use of an unreliable transport protocol is feasible and whether a session can be established with the peer node without routing packets through one or more relay devices.

If compliance with the session initiation protocol (SIP) standard is desired, the packets that identify the peer node may constitute an SIP "invite" message with added address information and the response may constitute an SIP "ringing" message with added address information. As a further aspect of SIP compliance, the traversal strategy to be used can be received by the originating device in an SIP "OK" message with added information or it can be sent by the originating device in an SIP "ACK" message with added information.

Whether or not the messages are SIP-compliant, in alternative variations, the originating device listens for packets from the peer node that are responsive to the plurality of packets sent to the external and internal IP/port addresses of the peer node. The originating device inspects the packets for a determination made by the peer device of the traversal strategy to be used. Alternatively, the originating device listens for packets from the peer node that are responsive to the plurality of packets and inspects the packets for information with which it can make a determination of the traversal strategy to be used. In this variation, the originating device announces the traversal strategy to be used in a message to the peer device.

One aspect of this embodiment may include sending from the originating device the plurality of unreliably transported packets to a plurality of external devices at the IP/port addresses and selecting the traversal strategy taking into account whether the NAT device fails to assign the external port number to the outgoing packets in a way that can be consistently predicted by the originating device, based on assignment by the NAT device of different port numbers to packets routed to the different external devices.

Another aspect involves, after sending a plurality of packets to the external and internal IP/port addresses of the peer node, listening for responsive packets from the peer device and establishing a session in reply to the response of packets, which session permits the originating device to send media packets to the peer device (or a proxy or relay for the peer device) without introducing an originating device's relay device in the chain.

In a case in which listening for the response the packets that identify the peer node reveals matching internal and external IP/port addresses of the peer node, the method may be refined to include selecting the traversal strategy establishes an unreliable transport session between the originating and peer devices using the internal IP/port numbers of the originating and peer devices without intermediate relay devices.

The method may include selecting the traversal strategy to be used before receiving acknowledgment packets from the peer node. The initiating peer device may select the traversal strategy, having received and responded to a probe launched by the peer node. In more detail, the method and variations described above may include listening for session setup packets from the peer node that do not acknowledge the sending of the plurality of packets to the external and internal IP addresses and port numbers of the peer node. The method proceeds by responsively acknowledging the session setup packets from the peer node whereby a first session is established with the peer node. An indicator is set that the first session is in progress and the method avoids using a second session with the peer node unless the second session is deliberately selected based on a preference for a second traversal strategy implemented by the second session. Alternatively, the first session may be used because it is the first established, without regard to the potential for selecting a second session.

In a case in which two alternative traversal strategies are feasible, any of the methods are variations described above may include selecting the traversal strategy with a shorter round-trip travel time for packets traveling between the originating device and the peer node.

A device embodiment includes a session initiating peer device that resolves NAT and firewall related issues for initiation of a peer to peer session. This initiating peer device includes wireless networking logic and resources adapted to transmit packets on a wireless network. It includes core components adapted to voice over IP messaging with a responding peer device. These core components include a user interface, a call controller, a session initiation core, a media transmission core and an IP stack. The initiating peer device further includes an application interface coupled to the call controller, which provides access to the NAT/firewall traversal components, which include a client messaging manager. The client messaging manager is adapted to packet at least the payload of an unreliable transport formatted packet into a reliable transport formatted packet and pass the reliable transport formatted packet to the IP stack. This is useful when the firewall blocks UDP traffic. The initiating peer device further includes an intermediate driver, positioned between the IP stack and the wireless networking logic and resources. The intermediate driver includes at least first and second virtual interfaces and a driver interface. The first virtual interface is coupled in communication with the IP stack. The second virtual interface is coupled in communication with wireless networking logic and resources. The driver interface is coupled in communication with the client messaging manager. The intermediate driver is adapted to carry out various actions. It is adapted to present an unchanging IP/port address appearance at the first virtual interface to the IP stack. It is adapted to handle session initiation and media transport packets routed through the IP stack and the first virtual interface, using the second virtual interface to communicate the session initiation and media transport packets to the wireless networking logic and resources. It is adapted to route a media transport packet received from the IP stack in an unreliable transport format through the driver interface to the client messaging manager to have at least its payload repacked into a reliable transport formatted packet.

One aspect of this device is that it may further include the intermediate driver having a third virtual interface. Both the second and third virtual interfaces are coupled in communication with the wireless networking logic and resources. The intermediate driver is further adapted to handle mobility of the initiating peer device between access points using the third virtual interface to timeshare some or all of the wireless list networking logic and resources with the second virtual interface. As an extension of this aspect, the wireless networking logic and resources may include a wireless radio tunable to one channel at a time and time sharing the radio includes is changing channels.

A system embodiment cooperates with several components that are not part of the system. For instance, a responding peer device may communicate with the system, but not be part of the base system. Similarly, a session initiation server and an IP based network may be coupled to the system, but not be part of the system. The peer to peer message routing system includes an initiating peer device. It includes a network controller (a type of server) coupled to the initiating peer device and to the session initiating server via the IP based network. It includes a media forwarder (another type of server) coupled to the initiating peer device via the IP based network. The initiating peer device includes various logic and resources. It includes logic and resources for topology discovery that are adapted to initiate a topology discovery session, to send probe packets to the network controller and to receive from the network controller response of packets that identify an IP/port address assigned by the NAT/firewall device to the topology discovery session. It includes logic and resources adapted to initiate hole punching, both cooperative hole punching through the NAT/firewall device that involves interacting with the responding peer device and probing for a private hole punch opportunity, if the responding peer device can be reached without the NAT/firewall device modifying the source IP/port address of packets sent to the responding peer device. The network controller also includes logic and resources. Setup logic and resources of the network controller are adapted to allocate an IP/port address dedicated to the initiating peer device and to set up a connection between the dedicated IP/port address and the session initiation server. The setup logic and resources are further adapted to cause the media forwarder to allocate IP/port addresses to handle receipt, re-addressing and forwarding of media packets being exchanged by the peer devices. The media forwarder, as needed, becomes coupled in a session with the initiating peer device.

One aspect of the system is that it may further include a responding peer device. The responding peer device may be coupled through the IP based network to other components of the system. It may include hole punching logic and resources as described above for the initiating peer device.

A related but potentially distinct embodiment is a method for a first mobile IP-based device to maintain an IP-based session with the second device while the first device is moving from one access point to another. The method begins with an IP-based session between the first and second devices conducted via a first route and first NAT/firewall traversal strategy. As the first device moves, it monitors a least a metric of signal strength to anticipate a need to adopt the second route and second NAT/firewall traversal strategy. Upon reaching a trigger point, which may be a threshold, moving average, or a network health statistic, the method proceeds with time sharing a radio transmitter and receiver between continuing the IP-based session via the first route and initiating a new access point search by testing a plurality of channels. If the current access point supports power saving mode or another receiver-unavailable status message, testing a particular channel may involve sending a receiver-unavailable message in the IP-based session. This receiver unavailable message may be a power saving mode announcement. The testing further includes switching the radio to a particular wireless channel during the effectiveness of the receiver unavailable message and sending one or more broadcast messages to access points. Optionally, a receiver unavailable message may be sent on the same channel that was used for the broadcast messages to the access points. This is optional, because the first device is unlikely to know whether the access points that are listening are adapted to respond to receiver unavailable messages. The method continues with switching the radio back to the IP-based session within an average time of less than 50 ms after sending the receiver unavailable message in the IP-based session. Upon switching the radio back to the IP-based session, a receiver available message is sent. The method continues with receiving packets in the IP-based session, then sending a receiver unavailable message and switching the radio back to the particular wireless channel being tested during the effectiveness of the receiver unavailable message. During the switchback time, the method includes listening for responses from one or more access points to the broadcast messages and capturing at least signal strength information for any responses received. The switchback time lasts an average of less than 50 ms. Alternatively, if the access point response time is quick enough, sending the broadcast messages and listening for responses may be combined in the same radio time-sharing slice, so the listening is completed before switching the radio back within the average time of less than 50 ms. As an improvement on this method, the radio might be switched back in an average time of 10 to 30 ms. Upon having searched the available channels or a subset of the available channels, the method continues with selecting a second NAT/firewall traversal strategy and establishing a second routing between the first and second devices without more than about a 50 ms interval disruption of the IP-based session.

A variation on the prior mobility embodiment involves time-sharing a radio when the current access point does not support power saving mode or any other receiver-unavailable message. Then, packets will be lost. The method proceeds much as described above, switching to a particular wireless channel, broadcasting queries and switching back to the IP-based session in less than 50 ms, participating a while in the IP-based session, then switching back and listening for responses. As described above, if the access point response time is quick enough, the broadcasting and listening may be conducted in the same time slice.

While various inventions are disclosed by reference to the preferred embodiments and examples detailed above, it is understood that these examples are intended to be illustrative rather limiting. Computer-assisted processing is implicated in the described embodiments. Accordingly, the present invention may be embodied in methods for connecting peer to peer sessions and/or maintaining sessions as a peer device moves among access points, systems including logic and resources to connect peer to peer sessions and/or maintain sessions as a peer device moves among access points, media impressed or data streams impressed (collectively, digital carriers) with logic to carry out connecting peer to peer sessions and/or maintaining sessions as a peer device moves among access points, or computer-accessible services that carry out connecting peer to peer sessions and/or maintaining sessions as a peer device moves among access points. It is contemplated that modifications and combinations will readily occur to those skilled in the art, which modifications and combinations will be within the spirit of the invention and the scope of the following claims.

We claim as follows:

1. A method of resolving NAT and firewall related issues for initiation of a session, the method including:
preliminarily determining NAT/firewall topology, before a user request for initiation of a session between an initiating peer device and a responding peer device, by sending two or more messages from the initiating peer device by an unreliable transport protocol through one or more NAT and firewall devices to two or more external IP/port addresses, listening for responses, and determining from the responses or lack of responses whether the firewall will allow initiation of unreliable transport protocol sessions and determining whether the NAT assigns IP/port addresses to the messages that are predictable by the initiating peer device;
upon receiving the user request for initiation and before transmitting session initiation messages to initiate the session, sending one or more probe messages through the one or more NAT and firewall devices to an external server, listening for responses and identifying from the responses one or more external IP/port addresses assigned by the NAT to the one or more probe messages;
proceeding with an exchange of session initiation messages, wherein a first session initiation message from the initiating peer device includes, in addition to standard session initiation information, at least an internal, inside the NAT, IP/port address and the external IP/port addresses for the initiating peer device;
using at least results of the preliminary determining NAT/firewall topology, selecting potentially successful hole punching strategies and commencing, if selected, cooperative and private hole punching to establish an unreliable transport session between the initiating and responding peer devices without forwarding through an external media forwarding device, wherein
cooperative hole punching means one peer device causing the NAT to open a port and listening for packets from an other peer device addressed to the opened port and
private hole punching means exchanging packets using the internal IP/port addresses of the initiating and responding peer devices without address modification by the NAT; and
in case hole punching fails, using a media packet relay path through a media forwarding device.

2. The method of claim 1, wherein the first session initiation message is an "invite" message complaint with an internet standards track protocol, a session initiation protocol (abbreviated "SIP").

3. The method of claim 2, further including listening for a SIP-complaint "OK" message with added information that identifies a selected traversal strategy to be used between the initiating and responding peer devices.

4. The method of claim 2, further including sending a SIP-complaint "ACK" message with added information that identifies a selected traversal strategy to be used between the initiating and responding peer devices.

5. A method for an originating device to select among alternative traversal strategies for IP-based traffic that is tolerant of unreliable transport, the method including:
preliminarily determining at least some characteristics of one or more NAT and/or firewall devices coupled between the originating device and an IP-based network by
sending from the originating device a plurality of unreliably transported packets to a plurality of IP/port addresses of one or more external devices on an opposite side of the NAT and firewall devices;
listening for one or more replies to the plurality of unreliably transported packets;
analyzing a pattern of the replies to determine whether the firewall device allows unreliable transport sessions and whether the NAT device operates to assign an external port number to outgoing packets can be consistently predicted by the originating device; and
retaining at least summary results of the analysis of the pattern of replies;
responsive to instructions by a user of the originating device to initiate IP-based traffic with a peer node, finding a feasible and preferred transport protocol and a relay or not-relay strategy by
using the at least summary results of the analysis of the pattern of replies, sending from the originating device to an external rendezvous device via a reliable transport protocol one or more packets that identify the peer node with which the IP-based traffic is being initiated and an internal IP address and port number being used by the originating device;
listening for a response to the packets that identify the peer node that provides at least a pair of two-tuples, which two-tuples identify internal and external IP addresses and port numbers of the peer node;
using the pair of two-tuples, sending a plurality of packets to the external and internal IP addresses and port numbers of the peer node to test whether a session can be established with the peer node without routing packets through one or more relay devices;
participating in a session with the peer node using a traversal strategy adapted to whether use of an unreliable transport protocol is feasible and whether a session can be established with the peer node without routing packets through one or more relay devices.

6. The method of claim 5, wherein:
the packets that identify the peer node constitute a Session Initiation Protocol (SIP) standard-compliant "invite" message with added address information and the response to the packets that identify the peer node constitutes an SIP standard-compliant "ringing" message with added address information.

7. The method of claim 6, further including listening for an SIP standard-complaint "OK" message with added information that identifies the traversal strategy to be used in the session with the peer node.

8. The method of claim 6, further including sending an SIP standard-compliant "ACK" message with added information that identifies the traversal strategy to be used in the session with the peer node.

9. The method of claim 5, further including:
the analyzing a pattern of replies further involves determining that the NAT device fails to assign the external port number to the outgoing packets in a way that can be consistently predicted by the originating device, if the NAT device assigns different port numbers to packets sent to different external devices among the plurality of external devices.

10. The method of claim 5, further including:
listening for responsive packets from the peer node that test whether a session can be established with the peer node without routing packets through a relay device; and
establishing a session in reply to the responsive packets to send media packets to the peer node (or a proxy/relay for the peer node) without introducing an originating device's relay device.

11. The method of claim 5, further including:
in a case in which listening for the response to the packets that identify the peer node reveals matching internal and external IP addresses and port numbers for the peer node, testing and selecting the traversal strategy that involves establishing an unreliable transport session between the originating device and the peer node using the internal IP address and port numbers of the originating device and peer node, without intermediate media relay devices.

12. The method of claim 10, further including:
selecting the traversal strategy before receiving the acknowledgement packets from the peer node.

13. The method of claim 5, further including:
listening for session set-up packets from the peer node that do not acknowledge the sending of the plurality of packets to the external and internal IP addresses and port numbers of the peer node;
responsively acknowledging the session set-up packets from the peer node, whereby a first session is established with the peer node; and
setting an indicator that the first session is in progress and avoiding using a second session with the peer node unless the second session is deliberately selected based on a preference for a second traversal strategy implemented by the second session.

14. The method of claim 5, further including:
listening for session set-up packets from the peer node that do not acknowledge the sending of the plurality of packets to the external and internal IP addresses and port numbers of the peer node;
responsively acknowledging the session set-up packets from the peer node, whereby a first session is established with the peer node.

15. The method of claim 5, further including:
in a case in which two alternative traversal strategies are feasible, further including selecting the traversal strategy with a shorter round-trip travel time for packets traveling between the originating device and peer node.

16. A session initiating peer device that resolves NAT and firewall related issues for initiation of a peer-to-peer session, the initiating peer device including:
wireless networking logic and resources that transmit packets;
core components adapted to voice over IP messaging with a responding peer device, the core components including a user interface, a call controller, a session initiation core, a media transmission core and an IP stack;
an application interface coupled to the call controller, that provides access to NAT/firewall traversal components including a client messaging manager, the client messaging manager adapted to pack at least the payload of an unreliable transport formatted packet into a reliable transport formatted packet and pass the reliable transport formatted packet to the IP stack; and
an intermediate driver, positioned between the IP stack and the wireless networking logic and resources, the intermediate driver including at least first and second virtual interfaces and a driver interface, wherein
the first virtual interface is coupled in communication with the IP stack,
the second virtual interface is coupled in communication with the wireless networking logic and resources, and
the driver interface is coupled in communication with the client messaging manager,
the intermediate driver being adapted to
present an unchanging IP/port address appearance at the first virtual interface to the IP stack,
handle session initiation and media transport packets routed through the IP stack and first virtual interface, using the second virtual interface to communicate the session initiation and media transport packets to the wireless networking logic and resources,
route a media transport packet received from the IP stack in an unreliable transport format through the driver interface to the client messaging manager to have at least its payload repacked into a reliable transport formatted packet.

17. The initiating peer device of claim 16, further including:
the intermediate driver having a third virtual interface, wherein
the second and third virtual interfaces are coupled in communication with the wireless networking logic and resources, and
the intermediate driver is further adapted to
handle mobility of the initiating peer device between access points using the third virtual interface to timeshare some or all of the wireless networking logic and resources with the second virtual interface.

18. The initiating peer device of claim 17, wherein the wireless networking logic and resources include a wireless radio tunable to one channel at a time and timesharing the radio includes changing channels.

19. A peer-to-peer message routing system, for routing of messages from an initiating peer device to a responding peer device, collectively referred to as the peer devices, through at least one NAT/firewall device positioned between the initiating peer device and an IP based network, utilizing a session initiation server coupled to the IP based network, the system including:
an initiating peer device;
a network controller coupled to the initiating peer device and to the session initiating server via the IP based network;
a media forwarder coupled to the initiating peer device via the IP based network;
wherein the initiating peer device includes topology discovery logic and resources adapted to initiate a topology discovery session and send probe packets to the network controller and receive from the network controller responsive packets that identify an IP/port address assigned by the NAT/firewall device to the topology discovery session;
wherein the initiating peer device includes hole punching logic and resources adapted to cooperatively hole punch through the NAT/firewall device by interacting with the responding peer device and to probe for a private hole punch if the responding peer device can be reached without the NAT/firewall device modifying a source IP/port address of packets sent to the responding peer device;

wherein the network controller includes setup logic and resources adapted to
   allocate a IP/port address dedicated to the initiating peer device and set up a connection between the dedicated IP/port address and the session initiation server, and cause the media forwarder to allocate IP/port addresses to handle receipt, readdressing and forwarding of media packets being exchanged by the peer devices.

20. The system of claim 19, further including a responding peer device coupled to the IP based network, wherein the responding peer device includes hole punching logic and resources adapted to cooperatively hole punch through the NAT/firewall device by interacting with the initiating peer device and to respond to the probe for the private hole punch if the responding peer device is reached through the NAT/firewall device without the source IP/port of address packets having been modified by the NAT/firewall device.

21. A method for a first mobile IP-based device to maintain an IP-based session with a second device while the first device is moving from one access point to another, the method including:
   beginning with a IP-based session between the first and second devices conducted via a first route and NAT/firewall traversal strategy;
   as the first device moves, monitoring at least a metric of signal strength to anticipate a need to adopt a second route and NAT/firewall traversal strategy;
   upon reaching a trigger point in the monitoring, time sharing a radio transmitter and receiver between continuing the IP-based session via the first route and initiating a new access point search by repeatedly, for a plurality of wireless channels
      sending a receiver-unavailable message in the IP-based session,
      switching the radio to a particular wireless channel during the effectiveness of the receiver-unavailable message in the IP-based session,
      sending one or more broadcast messages to access points, followed by at least one receiver-unavailable message to the access points and listening for responses from one or more access points to the broadcast messages and capturing at least signal strength information,
      switching the radio back to the IP-based session within an average time of less than 50 milliseconds after sending the receiver-unavailable message in the IP-based session and sending a receiver-available message, and
   upon having searched available channels in the plurality of wireless channels or having received a plurality of responses indicating the availability of new access points on the particular wireless channels, selecting a second NAT/firewall traversal strategy and establishing a second routing between the first and second devices without more than about 50 milliseconds disruption of the IP-based session.

22. The method of claim 21, further including, between sending the broadcast messages and listening for the response:
   switching the radio back to the IP-based session within an average time of less than 50 milliseconds after sending the receiver-unavailable message in the IP-based session and sending a receiver-available message;
   receiving packets in the IP-based session, then sending a second receiver-unavailable message in the IP-based session, and switching the radio back to the particular wireless channel during the effectiveness of the receiver-unavailable message in the IP-based session.

23. A method for a first mobile IP-based device to maintain an IP-based session with a second device while the first device is moving from one access point to another, the method including:
   beginning with an IP-based session between the first and second devices conducted via a first route and NAT/firewall traversal strategy;
   as the first device moves, monitoring at least a metric of signal strength to anticipate a need to adopt a second route and NAT/firewall traversal strategy;
   upon reaching a trigger point in the monitoring, time sharing a radio transmitter and receiver between continuing the IP-based session via the first route and searching for a new access point by repeatedly, for a plurality of wireless channels
      switching the radio to a particular wireless channel,
      sending one or more broadcast messages to access points, listening for responses from one or more access points to the broadcast messages and capturing at least signal strength information, and switching the radio back to the IP-based session within an average time of less than 50 milliseconds;
   upon having searched available channels in the plurality of wireless channels or having received a plurality of responses indicating the availability of access points on the particular wireless channels, selecting a second NAT/firewall traversal strategy and establishing a second routing between the first and second devices without more than about 50 milliseconds disruption of the IP-based session.

24. The method of claim 21, further including, between sending the broadcast messages and listening for the response:
   switching the radio back to the IP-based session within an average time of less than 50 milliseconds;
   receiving packets in the IP-based session, then switching the radio back to the particular wireless channel.

* * * * *